US012482025B2

(12) United States Patent
Gilbertson et al.

(10) Patent No.: US 12,482,025 B2
(45) Date of Patent: Nov. 25, 2025

(54) SYSTEM, METHOD, AND DEVICES FOR MANAGING TRANSACTIONS AT A RETAIL BANKING LOCATION

(71) Applicant: 3-East, LLC, Parkesburg, PA (US)

(72) Inventors: Matthew R. Gilbertson, Downingtown, PA (US); Timothy A. Freese, Coatesville, PA (US); Jeffrey E. Gilbertson, Honey Brook, PA (US)

(73) Assignee: 3-East, LLC, Parkesburg, PA (US)

( * ) Notice: Subject to any disclaimer, the term of this patent is extended or adjusted under 35 U.S.C. 154(b) by 193 days.

(21) Appl. No.: 18/439,030

(22) Filed: Feb. 12, 2024

(65) Prior Publication Data

US 2024/0185313 A1   Jun. 6, 2024

Related U.S. Application Data

(63) Continuation of application No. 15/896,721, filed on Feb. 14, 2018, now abandoned, which is a
(Continued)

(51) Int. Cl.
| | |
|---|---|
| *G06Q 30/06* | (2023.01) |
| *G06Q 20/10* | (2012.01) |
| *G06Q 20/18* | (2012.01) |
| *G06Q 20/20* | (2012.01) |
| *G06Q 40/02* | (2023.01) |
| *G07D 11/00* | (2019.01) |

(Continued)

(52) U.S. Cl.
CPC ........... *G06Q 30/06* (2013.01); *G06Q 20/108* (2013.01); *G06Q 20/18* (2013.01); *G06Q 20/20* (2013.01); *G06Q 20/208* (2013.01); *G06Q 40/02* (2013.01); *G07D 11/0093* (2013.01); *G07D 11/22* (2019.01); *G06Q 10/063* (2013.01)

(58) Field of Classification Search
CPC ...... G06Q 30/06; G06Q 20/108; G06Q 20/18; G06Q 20/20; G06Q 20/208; G06Q 40/02; G06Q 10/063; G07D 11/22; G07D 11/0093
USPC ........................................................ 340/5.7
See application file for complete search history.

(56) References Cited

U.S. PATENT DOCUMENTS

| | | | |
|---|---|---|---|
| 2008/0114697 A1* | 5/2008 | Black ................. | G06Q 20/3674 705/67 |
| 2010/0205063 A1* | 8/2010 | Mersky ............... | G06Q 20/204 705/40 |

(Continued)

*Primary Examiner* — Daniel A Hess
(74) *Attorney, Agent, or Firm* — Bonini IP Law, LLC; Frank J. Bonini, Jr.

(57) ABSTRACT

A system, method and devices are provided for conducting retail banking transactions, and more particularly for transacting business with customers of the banking establishment, where those customers make deposits at a deposit box after the retail banking branch locations are closed. The present system, method and devices are implemented to manage logistics of the after hours deposits in retail banking facilities, and include operations of the deposit box, hosting of the transaction management, and data, and managing transactions where a retail banking customer may prestage the transaction prior to arriving at the deposit box location. The present system also provides surveying and reporting of transactional data in connection with the transactions, as well as the events and usage of the deposit box and transacting details.

24 Claims, 16 Drawing Sheets

Related U.S. Application Data continuation-in-part of application No. PCT/US2017/025087, filed on Mar. 30, 2017.

(60) Provisional application No. 62/315,511, filed on Mar. 30, 2016.

(51) Int. Cl.
*G07D 11/22* (2019.01)
*G06Q 10/063* (2023.01)

(56) References Cited

U.S. PATENT DOCUMENTS

2016/0014552 A1* 1/2016 Hanson ................ G06Q 20/108
  455/456.3
2018/0165663 A1* 6/2018 Naik .................. G06Q 20/3223

* cited by examiner

FIG. 7A

| ID: | 0007000T47L | Created on: | 7/17/2017 | Drop value: | $10.00 |
| Account: | 8654312304 | Created by: | the.owner@restaurantA.com | Number of bags: | 1 |
| Status: | Drop entered, but not made | | | | |

Bag/Envelope Reference # 07172017-07   Value: $10.00

Cash/money   $10.00

— 385

[Delete] [E-mail] — 386

| ID: | 0007000T47L | Created on: | 7/17/2017 | Drop value: | $11,000.00 |
| Account: | 8654312304 | Created by: | the.owner@restaurantA.com | Number of bags: | 1 |
| Status: | Drop entered, but not made | | | | |

Bag/Envelope Reference # 14   Value: $11,000.00

Cash/money   $11,000.00

[Delete] [E-mail]

| ID: | 0007000T47L | Created on: | 7/17/2017 | Drop value: | $1,745.00 |
| Account: | 8654312304 | Created by: | the.owner@restaurantA.com | Number of bags: | 1 |
| Status: | Drop entered, but not made | | | | |

Bag/Envelope Reference # 07172017-6   Value: $1,745.00

Checks   $1,745.00

[Delete] [E-mail]

FIG. 7B

SYSTEM, METHOD, AND DEVICES FOR MANAGING TRANSACTIONS AT A RETAIL BANKING LOCATION

CROSS-REFERENCE TO RELATED APPLICATIONS

This patent application claims the benefit under 35 U.S.C. 119 and 35 U.S.C. 120 of and is a continuation of U.S. patent application Ser. No. 15/896,721, filed Feb. 18, 2018, entitled "System, Method, and Devices for Managing After Hours Transactions at a Retail Banking Location", and claims the benefit under 35 U.S.C. 119 and 35 U.S.C. 120 of International Application Serial no. PCT/US17/25087, filed on Mar. 30, 2017, and U.S. provisional application Ser. No. 62/315,511, filed Mar. 30, 2016, both entitled "System, Method, and Devices For Managing Retail Transactions at a Retail Location", the complete contents of which are herein incorporated by reference.

BACKGROUND OF THE INVENTION

1. Field of the Invention

The invention relates to retail facilities, and more particularly to a system, method and devices for conducting transactions at a commercial or other retail banking facility, and in particular, to depository transactions involving the deposit of cash, checks or other physical tender.

2. Brief Description of the Related Art

Retail establishments have attempted to expedite customer service and provide convenience to customers by providing service where the customer may remain in a vehicle and complete the transaction at a drive-up window or similar delivery mechanism (pneumatic tube system for example). Typically, the customer waits in the customer's vehicle, in a line, until that customer's turn. Retail banks are examples of one type of establishment that operates drive-up windows for their customers.

Retail banking establishments are seen in locations throughout the country. Although on-line banking has served to handle a number of transactions, a number of consumer and business transactions are handled in person at a retail bank branch. The bank branches may be a branch or location of a for profit bank or of a nonprofit, such as a credit union. A typical retail branch may include an automatic teller machine, and typically has personnel staffing a counter. Bank employees may handle a number of duties, which in some instances requires them to handle transactions within the physical branch at the counter, while at other times, the bank employee may leave the counter or window to perform another duty, which may entail assisting another customer or a fellow employee.

The physical layout of the retail banking facility often has a main area within the building where customers may complete forms, and wait in line (if a number of customers are present) and have their transaction completed at the counter or window within the bank facility. In addition, many facilities have drive-up banking capabilities where customers are serviced while remaining in their vehicles. This often may be configured where the driveway lane passes by a bank window that is staffed by one of the bank employees (within the facility). The customer is able to transact at the window, and usually there is a pass-through opening, such as a deal-drawer or pneumatic tube delivery system, through which the customer and banking employee may exchange items, such as, checks, slips, bank cards, cash and the like. In other instances, the drive-up banking may involve a lane that is remotely situated from the window of the facility, and may require the use of a carrier, where the customer can place items in a carrier. Some carriers are captive carriers whereby the carrier remains as part of the pneumatic delivery system, while other carriers are separate removable containers (and typically referred to as a 'carrier'), which when placed in the pneumatic tubing, will be forwarded to the window or other counter. Retail banking facilities may have multiple drive-up lanes, where one passes a window, and where one or more others are remotely situated from the window and requires transactions to be made via carrier. In each of these instances, the customer typically remains in the customer's vehicle, and is served by the bank personnel attending to the window or drive-up units.

However, it is often the case where a commercial business receives customer payments over the course of its usual operating hours, which may extend into the evening or early morning hours, when retail banking facilities are closed. Traditionally, the retail banking facilities have provided a night deposit box, which provides the capability for a business to make deposits when the banking facility is not staffed. When businesses collect payments from their customers in the form of cash and checks, the businesses need to make regular bank deposits so that these customer payments are transferred to a checking account of the business. The business has a desire to place the cash and checks into s secure location, and preferably, a deposit in a bank is more secure than keeping the money at a safe or cash register at the business location. One method that has been utilized is an automated teller machine (ATM) deposit. However, the ATM machine may be unsuitable for receiving large amounts of cash and checks, and may have other drawbacks, such as limitations on the amounts and/or number of checks that may be deposited in a day or single transaction.

Banking facilities recognize this, and some banks provide a depository, such as, for example, a drop or deposit box at the bank's retail location. This may be known as an after hours depository or night drop. In some instances, the bank may provide a customer with a key to allow the customer to access the secured drop box on the exterior of the building at the bank branch. In some instances, the bank may even provide the customer with a special bag having a lock, into which the banking customer may place its checks, cash, credit and debit card receipts, along with deposit slips that indicate the checks and cash amounts. In other instances, the banks may provide special envelopes to customers for use in making an after hours deposit. In many instances, night or after hours depository services provided by the banking establishment are offered to customers for a fee. The after hours services may be useful for example, when the retail facility is closed, e.g., holidays, or where personnel has left, or where the facility is no longer staffed in the teller or service areas).

Once the after hours deposits have been received, an employee from the banking facility, typically a bank branch manager, teller or other employee designated to process the after hours deposits, collects the bags from the depository. In some cases, the customer may opt for the bank to keep the bag unopened until the customer is on site at the banking facility, while in other instances, the bank may open the bag, and account for the funds in the deposit bag. Typically, the customer of the bank may select an option as to whether to be present or simply have the bank process the deposit funds without the customer present. When the former option is used, there may be a delay of fund posting and availability. In the latter case, the bank opens the customer bag and processes the after hours deposit during its next business day, and does so in accordance with Federal Deposit Insurance Corporation (FDIC) regulations.

SUMMARY OF THE INVENTION

A system, method and devices are provided for conducting and facilitating retail transactions at a retail facility which typically take place after hours, that is, when the facility is closed. Preferred embodiments handle transactions that include deposits that are made by customers at the retail transacting location, such as, for example, a bank branch that is designated to receive deposits outside of the typical business hours. The methods, systems and devices may be used to carry out and manage after hours deposits of funds, such as checks and cash, at a bank facility (e.g., such as a branch location). Although a bank is referred to, the system, method and devices may be used in connection with credit unions, which also may be referred to as a banking establishment, but which technically, are nonprofit organizations.

The present system, method and devices preferably are implemented in conjunction with business establishments, including retail establishments, and, in particular, banks and credits unions (referred to collectively, as banks or banking establishments). According to some preferred embodiments, methods, systems and devices of the invention may be employed for use in conjunction with retail banking facilities, and more preferably, with retail banking facilities offering deposit box services for after hours receipt of customer deposits (i.e., an after hours depository). The system, method and devices also may be implemented in conjunction with other industries such as, for example, retail pharmacy operations, or other establishments where a customer makes a deposit (returning keys to a car rental location or dropping a key off at an automobile establishment), or conducts another transaction involving a physical transfer of an item.

The system includes sensing and communications components that communicate signals, and which are utilized in conjunction with customer identification and transactions. According to some embodiments, the system may be implemented to identify a customer that has come to the facility to make a deposit of cash, checks or other tangible payment items, for deposit into a customer account. The system preferably is configured to control an area of the facility into which the customer may place deposits, such as the banking facility's deposit box. The system preferably regulates access to the area, such as a deposit box opening, into which customers may place their deposits (bags, envelopes and the like). Embodiments of the system and method may include the use of devices or other mechanisms that are designed to actuate when a customer has been verified. Customer access preferably is provided on a customer by customer basis. The after hours facility, such as a banking facility, is provided with a containment, which may comprise a deposit box that preferably has a mechanism that controls the access opening. The access opening preferably is blocked until a deposit is to be made. A panel may be provided to cover or otherwise block access to the access opening, and may be retracted (or another mechanism actuated) to provide the customer with access to the deposit box opening. A blocking member may block access to the opening, which according to some embodiments, for example, may comprise a panel, door, drawer, slide or other element.

In implementing embodiments of the system and method, the customer may provide the deposit particulars from a location that is remote from the deposit facility, and at a time prior to making the actual deposit. The customer may prepare deposit information prior to the customer arriving at or visiting the deposit facility. A customer platform may be provided for the customer to access and enter information using a customer owned device, such as, for example, a smartphone, tablet, or computer. For example, the customer may specify that the customer is depositing an amount, or amounts, and the type of the deposit, such as cash, checks, food stamps, mixed, and the like. The customer may enter the information and associate that transaction with a customer account. The customer may carry this out by communicating via a website, portal or application that is provided for the customer to access, and which preferably is associated with the transacting system. The customer access site may be a computer or server owned or operated by the banking facility or by a provider of services for the facility, or, according to some preferred embodiments, may be operated by a third party hosting company. A customer access mechanism, such as, for example, a software application, on-line portal, or website, may be provided for customers to use and access to input transaction information. This may be done prior to the customer physically making the after hours deposit. The system components preferably communicate information, so that the customer transaction information is provided and the establishment receiving the deposit may then have the details of the customer transaction. According to some embodiments, at least some transaction information preferably is communicated to components at the deposit facility so that the deposit mechanism may confirm a matching customer transaction when the customer has arrived.

According to embodiments, the deposit box is configured with a regulation mechanism for regulating access to the deposit box opening. The access opening is regulated based on the user transaction. According to some embodiments, the deposit box may include a mechanical key lock, in addition to an electronic regulating mechanism, so that the deposit box also may be accessed using a traditional lock and key method, as an alternative or back up, where the user is unable to actuate the mechanism through other means.

The deposit box may be configured for use by a customer with or without a prestaged transaction. For example, where a customer arrives at the deposit box, an input mechanism, such as a tablet or touch screen, may be provided at the location of the drop box. A user may enter information through the tablet touch screen or other input device so that the system can verify the user. According to some embodiments, the input mechanism may comprise a tablet touch screen that is configured to communicate with one or more computing components of the retail banking establishment, and/or a hosting computer, so that a user desiring to make a deposit may be verified. The input mechanism at the deposit box may include or have associated therewith one or more other reading and sensing components, such as, for example, a biometric reader (fingerprint scanner), camera, other scanner. The information obtained at the deposit box input mechanism may be communicated to another computer for processing and verification. Embodiments may be configured to link the deposit box operating mechanism to receive signals from a computer that processes the inputs. In one exemplary embodiment, a tablet is provided at the deposit box which communicates through a local network, and the local network has wireless communication capabilities to exchange information with a remotely situated computing component that provides and/or processes user information (such as verifications based on the inputs at the deposit box, e.g., from an input mechanism), and provides instructions that are communicated to the operating mechanism to regulate access to the deposit box. The local network may include Wi-Fi and cellular capabilities for exchanging information both locally and remotely (e.g., remote from the facility where the deposit box is located).

The deposit area preferably includes a deposit receptacle that is specially configured to identify a customer based on the presence of a customer device (e.g., phone, tablet). The deposit area includes a regulatable actuation component, which according to some embodiments, may comprise a solenoid that operates to block and release an access panel that regulates access to the access opening of the deposit containment. The actuation component preferably is associated with circuitry that is designed to communicate with a user device using low energy communications, such as, for example, short-range wireless interconnection protocol (e.g., Bluetooth®). The customer device preferably is configured to provide or permit the deposit box circuitry to issue a query or request an identification of the device. The user device preferably turns on its low energy communication protocol. This may be done by a user directly, or the device may be configured with software, such as downloadable software (e.g., an application), that the customer device operates in order to make the deposit at the retail bank branch location. The customer device software preferably communicates with or allows the deposit box circuitry to identify the customer device identification or other information used to identify the customer. The deposit box circuitry may be configured with instructions to communicate with, or obtain information from, one or more other components, including for example, the component or components that received the customer transaction information. The deposit box system may obtain a confirmation of the customer deposit transaction information (i.e., the transaction entered by the customer prior to visiting the deposit box location).

Customer identification may be done by having the customer pre-register customer devices. Upon arriving at the deposit box, the customer, when within a transaction location zone, where the customer is within the range of the wireless communication mechanism circuitry of the deposit box, may carry out the transaction to deposit the funds. The customer deposit transaction also may generate a customer receipt, which may involve providing a customer with an indication that the customer has made a deposit, and preferably provides the location at which the deposit was received. This may be issued to the customer through the short-range wireless mechanism of the deposit box, or may be provided to the customer via a customer email address associated with the customer account, or both.

The transacting information preferably includes customer provided details of the transaction, information from the deposit box circuitry sensing a customer device, and confirming operations (e.g., opening the deposit slot or door, closing the deposit slot, time at which the events occurred, as well as generation of images of the deposit, weight of deposits, or other sensed information). The deposit box circuitry preferably is linked for communication with one or more remote computing components that process the banking transactions, and may provide or otherwise make available deposit transaction information about events taking place at the deposit location, and in particular the deposit box. The system also is configured to provide a confirmation mechanism that allows a customer receive a receipt or other confirmation of deposits made.

The deposit box circuitry or associated computing component is configured to receive a signal or trigger from a customer sensor, which preferably, is done via a customer smart device that is within the service area of the deposit box (e.g., a detection area).

The system may be used to implement a method with devices for conducting transactions at a retail banking facility, where the transacting customer may pre-designate certain transaction information. This may be done through a suitable communication link, such as, through the Internet, or other preferably secure communications channel. The transacting user, such as a retail banking customer, may pre-designate the type of transaction using the user's computing device. The computing device preferably is registered so as to identify and associate the user and the device with the retail banking establishment, and, in particular, to one or more user accounts (e.g., customer accounts). Preferably, the user's transacting device is a wireless mobile computing device that may be transported from place to place (e.g., such as, for example, a smartphone or tablet). The user initiates a transaction using the user's computing device, which, for example, may be the transacting device, or may be another computing device (e.g., a laptop or desktop). Preferably, at least one wireless user computing device is registered so that the user may use this device for transacting at a retail banking location of the retail banking establishment that contains a deposit box configured to receive the user's deposit of funds. The user initiates the transaction, which may be done at a location remote from the retail banking establishment's retail location. The user completes the transaction by visiting a retail bank location of the retail banking establishment. For example, the user, at a location other than a retail establishment location, such as the user's place of business (which is remote from the retail bank location), may initiate a transaction that is a deposit of the nightly cash receipts, and will be a deposit of a sum of cash. The user identifies the transaction details, including that the transaction is a deposit of the sum of cash (which in this example is the amount of the nightly cash receipts from the user's business, for example, five thousand dollars). The system is configured to expect the user at one of the establishment's retail banking locations that have after hours deposit boxes. The user may choose which location to visit to make the deposit after the user has initiated the transaction by entering transaction details before arriving at a deposit facility location. Alternatively, the system may limit locations at which the user may make a deposit (e.g., based on geographic proximity, such as a 20 mile radius, within a state, county, or based on another detail). In this example, a deposit slot whose access opening is regulated (e.g., with a door) is provided at the retail banking facility to receive the user's cash deposit. A sensing mechanism is provided to sense the user when the user is within a desired predetermined location (e.g., a location at the retail banking facility where the transaction may be carried out). The sensing mechanism at the retail banking facility identifies the user device present at the facility, and, through communications with one or more other computing components of the retail banking establishment, identifies the consumer transaction that has been designated. The completion of the transaction may then be carried out.

The present invention also includes a mechanism for controlling access to the deposit box (i.e., receiving bin) at the retail banking facility, and is associated with the one or more retail computing components. The user device identification and transaction information preferably are processed, and the mechanism, such as, for example, a solenoid, is actuated to release the slot door of the deposit box to provide access for the user to transact, which, for example, may involve making the deposit of cash. The mechanism also may close the slot door once the transaction is completed, or after some other event, such as after a period of time (e.g., with no activity). In addition, one or more additional sensors or cameras may be provided to identify and confirm when a deposit has been made (for example, when the bin receives a cash deposit, envelope, slip or other item).

The system, method and devices also may be configured to survey transactions. The system, method and devices may provide triggers that actuate to identify and monitor a time of an event, which may, for example, be a transaction or component of a transaction. Some examples of event timing may include the amount of time a customer spends making the deposit, which may, for example, include information such as the time the customer is present at the deposit location (within the sensing area) before the deposit is actually made, as well as the transaction time. Other time intervals may be evaluated in connection with the type of transaction and the length of the transaction time, as well as frequency of usage. The system, method and devices, provide the banking facility with a means for determining and evaluating the expediency of transactions, e.g., at particular times of the evening, as well as with particular customers (e.g., types of businesses or accounts).

The system, method and device may be used to identify the types of transactions being made, and when they are being made. The system, method and devices preferably evaluate the time that the transactions are being made to determine whether patterns may exist for timing of particular types of transactions. This may be used to coordinate hardware needs (whether a second box is beneficial), retail banking deposit locations (whether another nearby retail bank branch should be provided with a deposit box), or both, or other aspects involved with the transactions.

The system, method and devices provide support to provisional credit, should the financial institution elect to implement this feature. Embodiments of the system are configured to identify the transaction made at the deposit box. Although a customer may make a deposit after hours which is unverified by any bank personnel, the system may obtain information about the deposit. Customer transacting information may be obtained, collected, stored, and associated with a customer account. The customer is provided with the capability of or identifying the transaction amount and types of funds being deposited, which according to preferred embodiments, may be accomplished by the customer pre-staging a transaction (e.g., transaction details, amount, types of funds being deposited, and/or other information). A customer making a deposit with the after hours deposit system, upon making a deposit, may be confirmed. The system may confirm the deposit, which may be one or more sensors at the deposit box, inputs of transaction details entered by the customer, or other means. The deposit confirmation may be used to associate the customer deposit with a customer account. A provisional credit may be applied for that customer. For example, if the customer makes a deposit after the customer's business has closed for the day, all or a portion of the deposited funds may be indicated to be available (as a provisional credit) enabling the customer to use that amount or portion (the provisional credit) to pay a vendor or supplier who arrives at the customer's business in the early morning hours the next day before any banking personnel can confirm the physical deposit. The system may be configured to condition provisional credits on the amount of the entire after hours deposit, or the amount of cash portion of the deposit, or cash and checks, or other exclusion or inclusion (e.g., not providing a provisional credit for gift cards that are part of the after hours deposit). The system preferably provides a link or association with the customer account at the bank establishment, based on the deposit box transaction details. The deposit box transactions may be a hosted operation, and the host preferably communicates the deposit information, and the system packages the information where the bank establishment attaches the deposit information to the customer account. According to preferred embodiments, the provisional credit is determined by the banking establishment, and preferably is accessed through the banking establishment computers or servers (or a server being operated by or for the establishment). According to some embodiments, the banking establishment (or other server) may receive the deposit transaction information from the host computer, and may use that information to adjust customer accounts for credit availability, such as, for example, the provisional credit. For example, the banking establishment may determine and set rules as to what amount of provisional credit (e.g., full, partial, or none at all) to implement with regard to each customer/customer account. The host computer may be configured to process transaction type information based on the types of deposits being made (or recorded by sensors), such as, for example, those shown and described herein (e.g., cash, checks gift cards), and provide a conditional credit amount for a customer transaction, and communicate that amount to the banking facility computers or servers. The data provided by the host computing component may be communicated to the financial institution's server, and the bank may determine the rules or applicability of provisional credit (e.g., based on internal metrics, guidelines, etc.).

The system, method and devices also may be operated in conjunction with transactions that take place within a retail banking facility. Alternatively, the transactions may be used in conjunction with other types of establishments. One or more of the features discussed herein in connection with any one or more of the embodiments may be implemented or combined with any of the other embodiments or other features.

BRIEF DESCRIPTION OF THE DRAWING FIGURES

FIG. 4 is an exemplary screen shot showing a home screen displayed for a customer log in.

FIGS. 7A and 7B is an exemplary screen shot showing a screen display generated for creating a new deposit.

DETAILED DESCRIPTION OF THE INVENTION

A system, method and devices are provided for conducting and facilitating transactions at a facility that typically take place after hours, that is, when the facility is closed. The transactions may involve a branch location of an establishment that a user, such as a customer, desires to carry out when personnel are not staffed or available at the location to handle transactions (e.g., after the location has closed). According to preferred embodiments, transactions include deposits that are made by customers at the retail bank's transacting location, such as a bank branch that is designated to receive deposits outside of the typical business hours. The system, method and devices are configured to handle the receipt of deposits from a customer, where the deposits may comprise physical items, such as cash, checks, or other forms of currency/legal tender. According to preferred embodiments, the method, systems and devices may be used to carry out and manage deposit transactions when a facility is closed, and preferably may include transactions involving the after hours deposit of funds, such as checks and cash. The method, system and devices may be implemented with or may comprise an after hours depository, such as a deposit box at a branch location of an establishment (e.g., a bank branch location).

Figure 1:
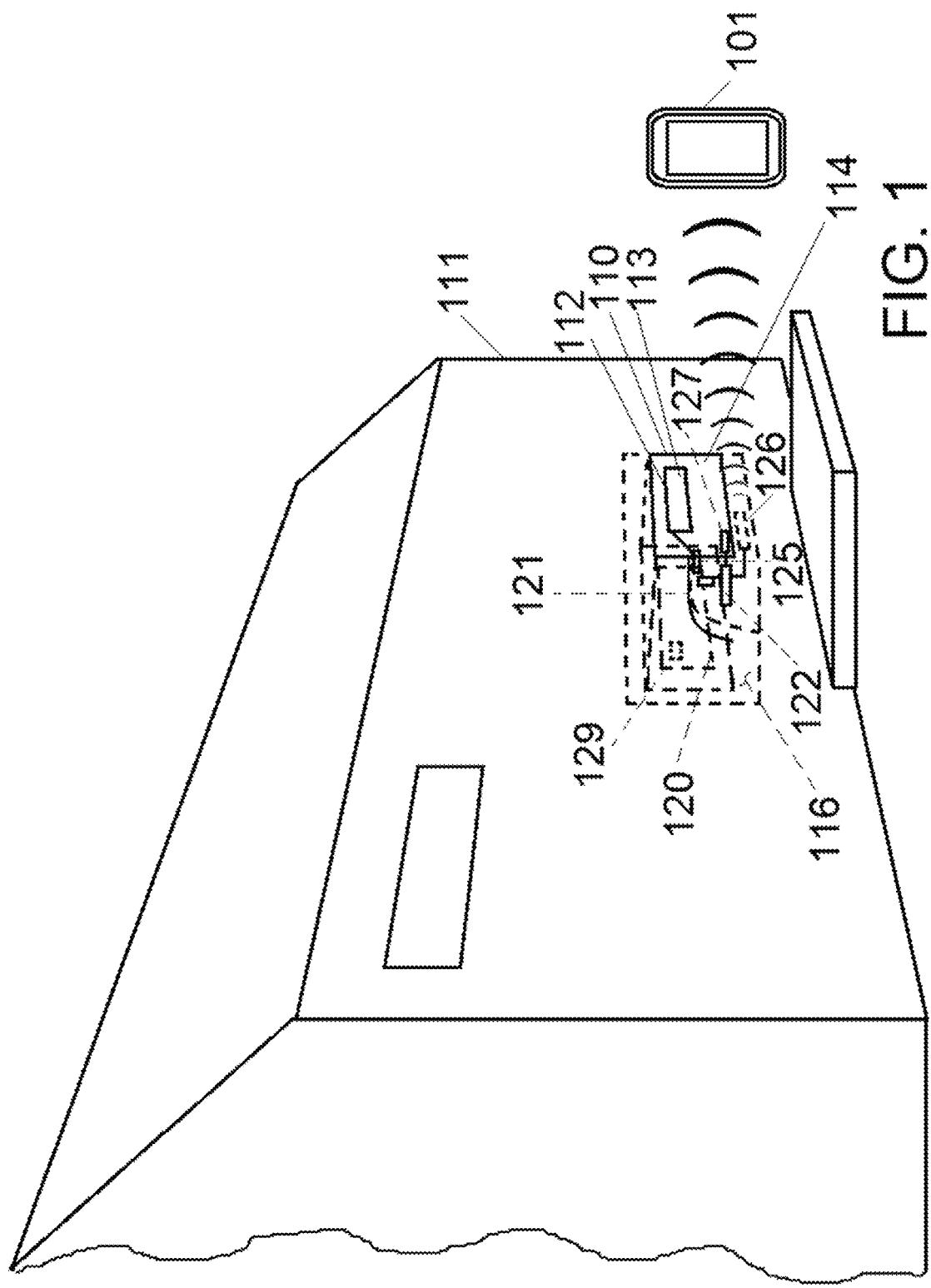
FIG. 1 is a schematic illustration showing a retail banking facility implementing the system and method according to an exemplary embodiment of the invention.

Referring to FIG. 1, a schematic illustration is provided to represent an embodiment of the invention, where a containment or receptacle is shown configured as a deposit box 110 installed on a structure 111, which in this example represents a branch of a banking establishment. The deposit box 110 includes an access opening 112 which is provided with a blocking portion shown comprising a panel 113. In the exemplary depiction shown, the panel 113 preferably is securable to the deposit box frame 114 and is disposed to block the opening 112 in order to prevent unauthorized access to the deposit box access opening 112 (e.g., a drawer, slide, door or panel). The deposit box itself may include a bin or container that communicates with the access opening 112 and is provided to receive the deposits submitted through the access opening 112. The bin interior space 116 preferably has space to receive multiple customer deposits. The deposit box 110 preferably may have an interior access means, such as a door panel 129, that permits access to the interior space 116 of the deposit box 110 from the inside of the banking establishment facility 111. Alternatively, an internal access door panel for use by personnel of the facility may be provided at the location of the customer access door or panel 113, and may comprise a larger door with a lock (to open the front portion or panel of the frame 114). The deposit box 110 preferably includes a mechanism that regulates access to the access opening 112.

According to an exemplary embodiment, where the deposit box 110 is configured as a box with a door panel 113, the deposit slot door or panel 113 is situated to block access to the access opening 112 and the deposit bin interior 116 (or a passageway leading to the deposit bin interior 116) until and unless a triggering event has occurred.

A regulating mechanism 120 is shown provided in conjunction with the exemplary deposit box 110. The regulating mechanism 120 may be provided within a housing 121 for protection, and preferably includes circuitry 122 with one or more memory elements containing software for regulating components to control the access door 113. The door panel 113 may be held in position to block the access opening 112, and, when access is desired (e.g., for an authorized user transaction), the regulating components may actuate to provide access to the opening 112, which preferably may involve moving the door panel 113 (pivoting, sliding, retraction or other movement) out of a blocking position to expose the access opening 112. According to some preferred embodiments, the regulating mechanism 120 may be provided having an actuator, which, for example, according to some preferred embodiments, may comprise a solenoid 125 that is connected to operate the door panel 113. The solenoid 125 may include a piston or other driving member that is moveable from a first position to one or more other positions (or a range of positions) to maneuver the door panel 113 between a blocking or locked position and an open position (exposing the access opening 112). The solenoid 125 may be actuated to release the panel 113 from its blocking position to provide access to the access opening 112. According to preferred embodiments, a sensor 127 is provided in the circuitry 122 which includes a transmitter 126 for transmitting signals (preferably low energy signals, e.g., such as for example Bluetooth®). The sensor 127 is configured in the circuitry 122 to confirm the detection of a customer device 101 that is nearby (within the sensing range). This may be carried out using a discovery mechanism, such as a service discovery protocol implemented within the circuitry and/or components.

A transaction may be enabled and carried out at the facility location when the customer device 101 is one that the sensor 127 and circuitry, including software, is programmed to recognize as matching a registered or authorized customer device (e.g., the device 101). Preferably, the regulating mechanism 120 also is linked to communicate with a customer transaction database, and receives information so that when a customer device (e.g., 101) is within the sensing area of the deposit box 110, and that device is designated and/or authorized for a transaction, the circuitry and software processes the signal from the device 101, and upon confirmation, may actuate the regulating mechanism 120, which in the embodiment illustrated actuates the solenoid 125 to release the blocking panel or door 113 to provide access to the access opening 112. According to some embodiments, the system is configured so that the regulating mechanism 120 authorizes a device and opens the panel 113 when a prior transaction step has been performed by the customer. For example, where the customer has entered transaction information for a transaction (e.g., a deposit) that the customer plans to make after hours at the facility, and that customer has a device associated with the customer account or the transaction, then when the customer arrives at the facility to make the deposit, and when the system recognizes the customer device, the system authorizes the regulating mechanism 120 to provide the customer with access to make the deposit (e.g., by actuating the solenoid 125 to open the door 113). According to some embodiments, the deposit slot, such as the access opening 112, may be separately provided and configured for transactions where a user device is required to actuate the slot door (e.g., the panel 113). The sensor 127 preferably is linked through a wired or wireless communication linkage, which may be a network, to exchange information with a computing component, which may be a server or other component on site or at a location remote from the retail banking facility (see e.g., FIG. 1) According to the exemplary embodiment illustrated, the sensor 127 is provided in an arrangement with circuitry 122 that preferably includes a processing component, such as, for example, a microcontroller, microprocessor or the like, which preferably has a memory and software that contains instructions for processing information (such as device recognition and transaction data. The information may be exchanged through a suitable communication mechanism, such as a network, Internet, VPN, or other communication link, that links the regulating mechanism circuitry 122 with a remote source that provides customer transaction information. The remote source may also provide a command to the retail computing component at the retail banking location and/or the deposit box circuitry to operate the deposit box. For example, an indicator of a device and a transaction time may be made available to circuitry associated with or provided with the regulating mechanism 120. Alternatively, the regulating circuitry may be controlled by a separate computing component that may be housed at or linked for communication with the branch facility, and the deposit box components. The depictions in FIG. 1 illustrate components of the system which, according to some embodiments, may be linked together through the circuitry of the deposit box.

The system may be configured to limit the range of locations at which deposits may be made, for example, within a 10 mile radius of the customer location, or some other parameter. As an example, where a customer has a single business location at X City, then the branch locations available for deposit may be those within the X City limits, or within 20 miles of the customer location (so that the customer may not be authorized to make deposits at a location hundreds of miles away).

According to an exemplary embodiment, the sensor 127 and computing component exchange information to verify the customer transaction and provide a signal to operate the actuator, such as the solenoid 125, to open the slot door 113 in order for the customer to insert a deposit. The solenoid 125 also closes the slot door 113, or alternatively, or in addition, the access opening or slot 112 may be closed by the customer after depositing the transaction materials (e.g., cash, deposit slip, envelope, or other material). Once the slot door 113 is closed, the solenoid 125 takes over, and again the door 113 remains closed blocking access to the opening 112 until an authorized transaction is confirmed for a customer (such as the next customer user, or a different transaction by the same customer).

According to some embodiments, the number of transactions for a customer may be limited, and a customer's ability to make consecutive deposits or multiple deposits for different companies may be limited or managed to provide handling of the transactions at the same retail bank branch location. The transaction is recorded for the customer, and the activity is confirmed to match the sensor detected customer or customer device with the customer's transaction.

Once the transaction has been completed, the customer may be provided with a receipt. This may be done electronically by sending a signal to the customer account information, so that when the customer logs on to the account, e.g., through an online banking portal or application, a receipt for the transaction (which may be a pending transaction due to the after hours nature) may be indicated. According to some other embodiments, another option is to provide a receipt to the customer, which may be generated and communicated through the regulating mechanism circuitry, and transmitted to the customer device 101 at the deposit location 111. According to some embodiments, a customer after hours deposit application may be provided for the customer devices that are used, and the application may receive a signal from the regulating mechanism 120 that communicates transaction details, such as that a deposit has been made or confirmed. This may be based on the opening of the door 113 and/or detection of an item entering the deposit slot 112 or bin 116. For example, the detection of items being received within the deposit box 110 may be made with a sensing component, such as, for example, a weight sensor, a camera or light detector, a motion sensor, or other detection component suitable for identifying a deposit into the box 110.

Figure 2:
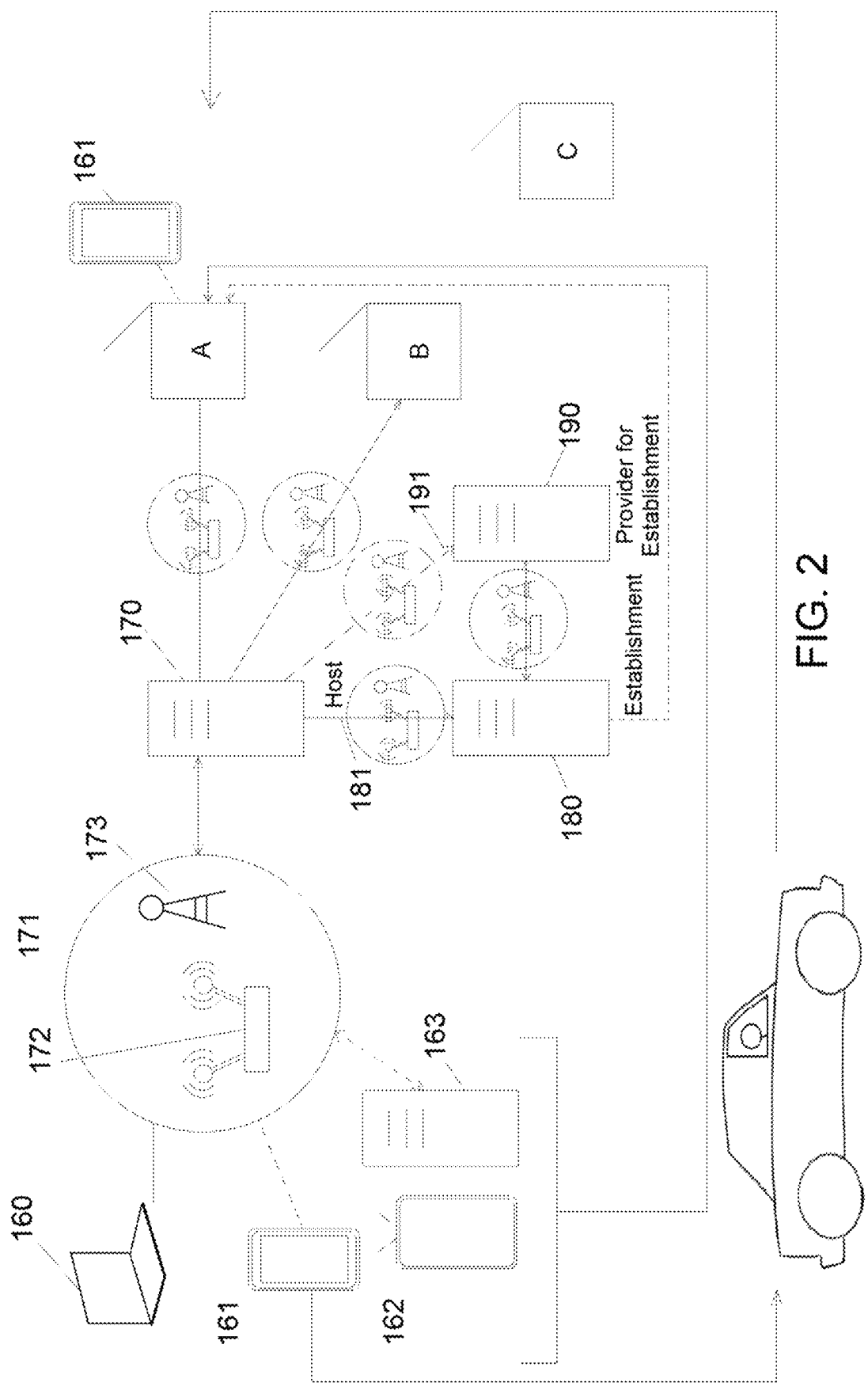
FIG. 2 is a schematic illustration of an exemplary representation of an arrangement of components and communications embodying a system used to carry out the method.

Referring to FIG. 2 a schematic depiction is illustrated representing a system for handling after hours deposits at a facility, showing an arrangement of components and communications. The components are illustrated to show an exemplary embodiment for managing after hours deposits for customers of a commercial establishment. In this example, a customer has a business that receives cash and checks as part of the customer's business operations (e.g., receipts from a restaurant). Referring to FIG. 2, a user device is represented by one or more of the user devices shown comprising a lap top computer 160, a smartphone 161, a tablet 162 and a desktop or workstation 163. A user may engage in transactions using one or more of the user devices. In this exemplary depiction, a user device 160, 161, 162, 163 is used to initiate a transaction. The user in this example has cash and checks to deposit after the user's business operations are completed for the day, and after the nightly closing of the business establishment (the bank) in which the user desires to make a deposit of the day's receipts (cash, checks, etc.). The user in this example has an account with the banking establishment and needs to deposit the funds (cash and checks) into the user account. The banking establishment has a plurality of retail banking locations or branches which are represented by A, B and C in FIG. 2. The retail banking locations preferably are located distant from each other to serve surrounding areas (or those traveling within the location). In this example, each of the retail branch locations includes a deposit box, such as the deposit box 110 described herein.

Alternatively, the system may be configured for use with existing deposit boxes by fitting a regulating mechanism, such as the regulating mechanism 120, to control the operation or access of the existing access door, drawer, or other component. In this example, the user logs on to the web site, portal or other electronic access means, preferably using an encrypted or other secure log on, and the user inputs the transaction details pertaining to the after hours deposit that the user will make at the facility branch (location A, B, or C in this example). Preferably, a transaction screen prompts the user for the transaction details, which may include the user account into which the deposit is to be made, the constituency of the deposit (checks, cash, etc.), and the deposit amount. As shown in FIG. 2, the exemplary user devices (laptop 160, phone 161, tablet 162 and desktop 163) include communications hardware and communicate with one or more transactional computing components. In the exemplary depiction, a hosting computer 170 is provided to serve a web portal or screen when the user makes a secure logon or connection. The user connection may be made through a suitable communication or network link 171, such as the Internet, VPN, and may be through a wired or wireless connection, Wi-Fi, cellular, satellite or the like. In FIG. 2, the communication network 171 is represented schematically, and shows a router 172 and cell tower 173 to represent some possible means for communication. The host computer 170 may provide information to the user device, e.g., smartphone 161, that includes details of the user account, and which may also include deposit transaction histories, such as deposits made, deposits outstanding (not yet dropped). The host 170 in this example is configured to communicate with one or more server computers that are owned or operated by or for the banking establishment. The system may require that the customer arrange with the banking facility the set up of the after hours deposit capabilities or features for a particular account or accounts. This may be done by configuring the user data information on the banking establishment's computer such as the establishment computer 180. The banking establishment may use a third party provider to secure and provide customer data, as well as to process customer data. For example, a provider computer 190 is shown in FIG. 2, and where the establishment utilizes a provider for all or some of its customer management account and data handling, the host 170 may be configured to communicate and exchange information between the provider computer 190 directly 191, or alternatively, may communicate 181 with the establishment computer 180.

In the exemplary arrangement depicted in FIG. 2, the host 170 preferably is configured to communicate with the deposit box components at the retail banking branch locations A, B and C. This may be done directly with the deposit box circuitry through a communication component at the retail branch location (A, B, or C), or alternately, may be done through a communication with a computer of the retail branch location (A, B, or C) that is connected to operate the deposit box (and regulating mechanism). In FIG. 2, a user device 161 is used to input transaction details by communicating the transaction details to the host 170. The user then travels to the branch location A with the user deposit, and configures the user device 161 to be able to engage in communications or recognition when the user with the device 161 is present at the deposit box location of facility A. The user device 161 in this example, turns on the Bluetooth® operations of the device 161 (by the user or through an application), and the circuitry at the deposit location senses and identifies the user device 161. The user device 161 in this example, also is configured with a banking application software for after hours deposits, and the software is configured to engage in communications at the deposit box of the facility A to confirm the identity of the user device 161. According to some alternate embodiments, the system may be configured to identify a user device where the user does not have a pre-installed application on that device, but has a device service discovery protocol active so that the sensing circuitry (e.g., sensors and/or detectors) of the deposit box location may make an identification of the user device.

According to some embodiments, the user may operate software on the user device (such as an application) that is specifically designed to facilitate the transactions (deposits at the banking facility). According to some other embodiments, the user may be present with the device, and the identification of the device itself provides the confirmation of the user.

According to some embodiments, the user device preferably turns on a wireless communication feature, such as, for example, low energy communications, like a short-range wireless interconnection protocol (e.g., Bluetooth®), and the device parameters may send periodic messages or signals indicating the presence of the device (e.g., a hello message). The system preferably is configured with a detection means, such as the sensor, which is configured to read information from the user device. The detection means may reside with or in association with the deposit box circuitry, and preferably is within a designated area in which the customer device is desired to be detected when it is present. For example, information read from each user device may contain: (a) the MAC address of the user wireless interface, which may provide a unique identifier, (b) the strength of the signal (RSSI), which provides an indication of the proximity of the user device (e.g., the average distance of the device from the scanning point or sensor location); and (c) vendor of the smart device (Nokia, Apple, Samsung, etc.). The Bluetooth® friendly name also may be provided. According to some embodiments, the user device may be provided with as code name that identifies the device based on one or more of the device parameters. The sensing mechanism of the deposit box preferably may be configured to recognize the type or class of device (CoD) so as to differentiate the type of device (smartphone, hands-free car piece, computer, LAN/network AP), to ensure communications only with certain device types. The power transmission of the Bluetooth® circuitry that is part of or associated with the deposit box may be configured to provide a desired transmission range, such as, for example, from centimeters to up to about 10 meters (or even farther). For example, the sensing inquiry may be set to one of several power levels. Bluetooth inquiries may comprise a number of different power levels which span from −27 dBm to 3 dBm so that different coverage zones may be established (for example, from 10 to 50 meters, although coverage may be limited to a smaller range). For example, the detection ranges may be increased or decreased by using a different antenna at the location of the deposit box where the sensing takes place (e.g., where the scanning signal is issued). Preferably, the range is small so as to limit transacting at the facility to the user being within close proximity to the deposit box location. The system may provide an adjustable range, if desired, that may be adjusted based on the physical locations. The sensor that is provided at or in association with the deposit box preferably scans for devices. For example, the sensor may monitor information that may include, a record or database identification (DB ID), a timestamp of the scan, the MAC address of the device located, an ID of the device, the signal strength (RSSI), the type or class of device (e.g., Smartphone, head phones), as well as the vendor of the device. An exemplary depiction of information that the sensor may detect is as follows in Table 1.

TABLE 1

| DB ID | Timestamp | MAC | ID | RSSI | CoD | Vendor |
|---|---|---|---|---|---|---|
| 64500 | 2017-09-18 20:13:11 | 00:22:8F:4D:2A:12 | earbud | −61 | earphone | VendorA |
| 89175 | 2017-09-18 20:14:00 | F8:1A:9E:0F:F2:22 | Myphone | −82 | Smartphone | BrandX |

According to some embodiments, the user device turns on Bluetooth® or makes sure that it is on, and that the device discovery (Bluetooth® discovery is on). The scanning sensor preferably identifies the user device, and preferably is configured to distinguish a user device from other devices. In this example, the user device has a particular MAC address that uniquely identifies the user device. The user device preferably is linked with or associated with a user or user account of the establishment. The MAC address preferably is part of the user device identification and is linked with the user or user account to provide recognition of the user. The system is configured to process the user identification information from the sensor and make a comparison of the information (which in this example is the MAC address of the user device detected within the sensing area of the deposit box location). The user is verified as a transacting user, and the user prior transaction information entering the deposit details, confirms the user transaction. The deposit box therefore may actuate to provide the user with access to make the deposit. The sensor is depicted and discussed in connection with the deposit box circuitry. Alternately, according to some embodiments, the sensor may be located proximate to the deposit box in a location or area where the sensor may detect a user with the user device, and may be configured to relay signals to actuate the deposit box mechanisms.

Preferred embodiments may be configured to limit returned scans to certain device inquiry access codes, such as smartphones, so that any other Bluetooth® device, such as an earphone, is not counted as an identification. Although a MAC address is illustrated as an example of a unique identifier, other identifiers of the smartphone may be used.

Referring again to FIG. 2, the facility A preferably has a computing component, which may be part of the deposit box circuitry or may be associated therewith, which, according to an exemplary embodiment, may communicate an identity of the user device 161 to the host 170. The host 170 processes the identity information and if the user device 161 (via identification parameters) matches the user profile and transaction, then the host 170 communicates a confirmation to the deposit box computing components. The deposit box receives the confirmation from the host 170 authorizing the deposit box to accept the customer deposit. Upon receipt of the confirmation, the deposit box actuates the deposit box access door to open and allow the user to make the deposit. The user deposits the cash and checks (in this example), and the deposit box door closes. Deposit boxes may be configured with a ramp, drawer, cute or other element or restriction, so that prior deposits contained within the box are not accessible when the access opening is made available to receive a subsequent deposit.

According to the exemplary depiction, after receiving the deposit at the facility A, the deposit box circuitry or computer associated with it, records the time and transaction details, for example, that a deposit has been made, and the customer identification (or device identification) associated with the deposit transaction. The facility computer may process the deposit transaction and communicate the transaction event to the host 170, or, alternatively or in addition, to the establishment computer 180. The host 170 preferably confirms the transaction deposit, and processes the transaction status to have a deposited status, instead of the prior outstanding deposit status. The host 170 then at a pre-designated time, communicates information for transactions occurring at the branch locations (A, B, C) during the after hours period (e.g., which may be from Monday evening after closing to a cut-off time early Tuesday morning). The information preferably includes the customer identification, via customer device account number or some other identifier, and also includes the transaction information and the transaction status. A computer processes the deposit transaction, such as, for example, the establishment computer 180 (or the provider 190) represented in FIG. 2, which receives the information and processes the deposit information.

In this example, the facility A receives the after hours deposit, and examines it during the next business day to check conformance with the deposit transaction information entered by the user for the user's customer account. The facility A therefore may be provided with a listing of the transactions that were made (deposits made) through the deposit box at facility A, and the transaction details. Once the transaction is confirmed for a user account, the facility A communicates the confirmed status to the establishment computer 180 or provider computer 190, and the customer account information is updated to verify the transaction has been accepted and confirmed. The customer account then is updated to make any confirmed funds accessible according to any account or banking rules in effect (e.g., cash immediately, checks within one business day). In the event that any of the deposit information does not match the actual deposits, the user account status may be maintained as an unconfirmed deposit, or measures may be initiated to contact or inform the customer (via another means). Another option may be to provide the host 170 with an indicator status for a transaction, which may enable the user to see a status or indicator upon the user's next log on. For example, one status indication may include designation of transactions that require further resolution (non-matching deposits), while another may include confirmed receipt of designated amounts and deposit types.

According to some preferred embodiments, a location that the customer may visit at the retail banking facility includes a deposit slot. The deposit slot may be a tray, drawer or door that includes a passageway suitable for receiving cash which may be configured to operate based on the actuation depicted and described herein in association with a customer device. According to some embodiments, the cash is received in the form of envelopes, such that, after the deposit has been made, when the slot opening is closed (or returned to a closed position), the deposit falls into a collection box or container. According to a preferred embodiment, the deposit slot door is electronically actuated, and may be set to open upon the triggering of a sensor. The sensor may be situated at or proximate to the deposit box opening, and is configured to sense a customer device with which the sensor and customer device wirelessly communicate (e.g., interconnect) or engage in an identification. The communication may involve the sensor detecting the identification of the customer device and/or customer using the device. In this aspect, the communication may comprise detection of the customer device. A customer, preferably, prior to arrival at the retail banking location, prepares the transaction information by preparing the transaction details, which, for example, may include the transaction type, transaction amount, and the account. According to some alternate embodiments, the transaction details may include the retail banking location (e.g., branch) at which the transaction will be carried out. The customer preferably operates a computing device, such as a smartphone or computer, and enters the transaction details so they are communicated to the computing system comprising of one or more of the retail computing components or provider thereof. According to some alternate embodiments, the customer may have an application on the customer smartphone, which provides an identification of the customer and/or device and enables the identification to be communicated when the customer arrives within the sensor field, which in this example is at the deposit slot.

Figure 3:
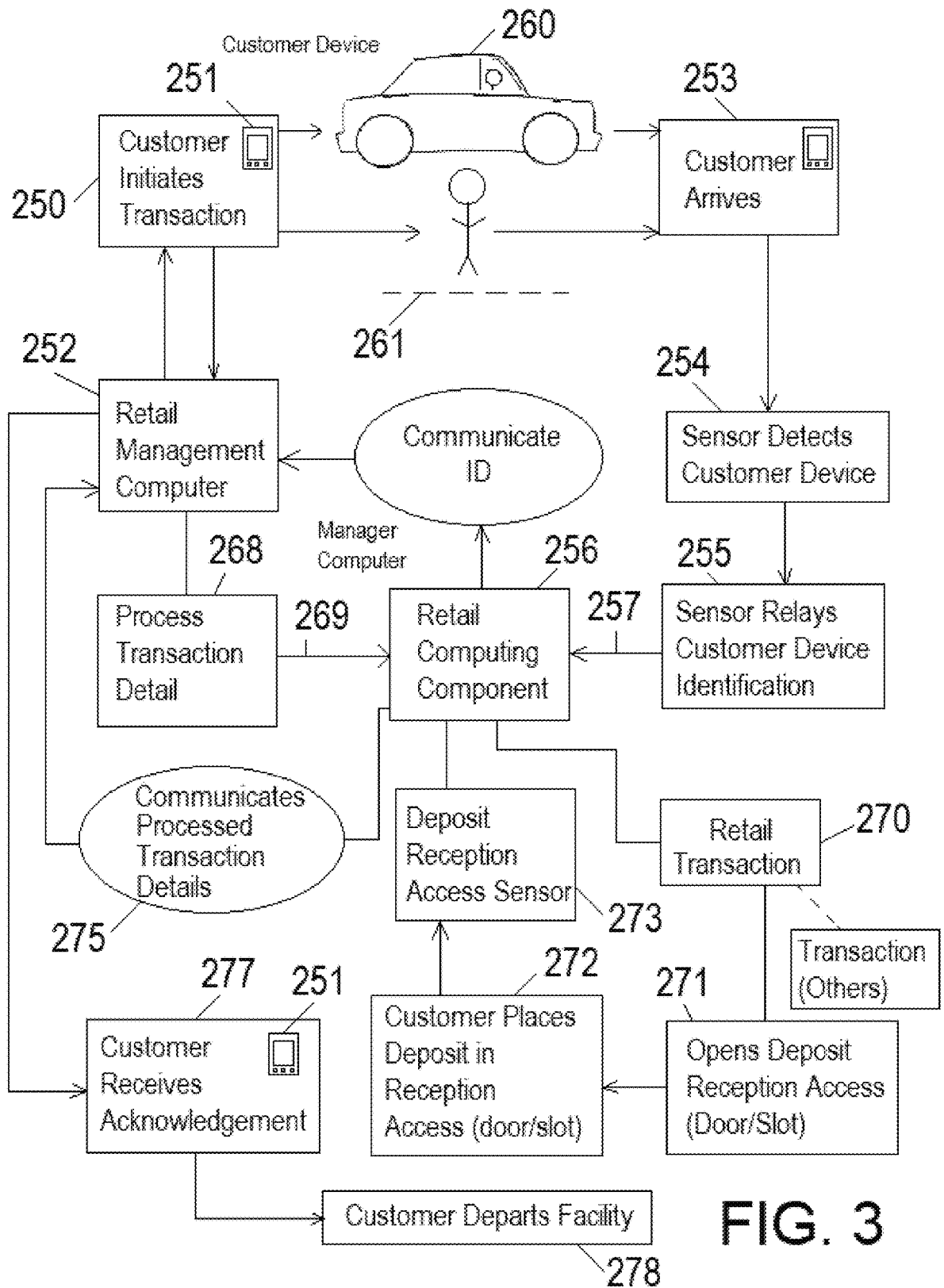
FIG. 3 is a schematic flow diagram depicting an exemplary embodiment of a system and method according to the invention, for an implementation where a customer device is used for a transaction that may be pre-designated prior to arrival at the facility.

Referring to FIG. 3, a flow diagram illustrating another example of a method for managing transactions at the retail banking facility. The exemplary system represented in FIG. 3 depicts an example where a transacting user is a customer, and where the customer may pre-designate the transaction prior to arrival at the retail banking facility. The system may be configured to provide a capability for the customer to communicate (via the customer device) with a retail management computer which, for example, may be a server situated remotely from the retail banking facility where the transaction will be carried out. In the example illustrated in FIG. 3, the transactions are retail banking transactions that are to take place at a retail banking facility location. A customer initiates a transaction, block 250, using a computing device 251, which, for example, may be a smartphone. In this example, the customer associates the device 251 by engaging in communications with a retail management computer or server, block 252, and the customer preferably registers the customer device 251 to identify the customer association with that device 251. The customer, as part of the transaction initiation, block 250, engages in communications with the retail management computer, block 252, to designate the transaction type that the customer desires to carry out at the retail branch location. The customer provides the details of the transaction, which in this example is a deposit of cash. The customer specifies the cash amount that the customer is going to deposit. According to some embodiments, the customer also may have an option or be required to pre-designate a location by identifying the retail banking facility at which the deposit will be made. The system may be configured so that a customer may identify one or more transactions, or may be limited to a single transaction or transaction type per day (and/or per customer), or may be able to specify a plurality of transactions for the same account, or for one or more other accounts of that customer. In this example, the retail management computer, block 252, receives and stores the transaction details. The customer travels to the retail banking facility and arrives, block 253. A sensor at the facility detects the customer via the customer device 251, block 254. The sensor communicates the customer device identification detected, block 255. Preferably, the sensor relays the customer device information to a retail computing component or kiosk, block 256. The retail computing component, block 256, may be a computing component, which preferably is situated at the retail banking facility (the computing component may be a kiosk that is configured with computer hardware components and software, and communication hardware for receiving and processing sensor and transaction information. The kiosk may integrate with other components and mechanisms to manage deposit transactions. The retail computing component, block 256, is programmed with instructions for receiving and transmitting information and managing the equipment at the retail banking facility, such as, for example, mechanisms that are used to receive deposits (e.g., by releasing or opening a door or slot). The retail computing component, block 256, also may be used to process and communicate information from sensors that interconnect with or otherwise receive signals from the consumer computing device. For example, according to some embodiments, a sensor may be provided to communicate through a short-range wireless interconnection protocol (e.g., Bluetooth®) to interconnect with a computing device of a transacting user or otherwise identify the user device via the device identity used to engage in the low energy communication or short-range wireless interconnection protocol (e.g., Bluetooth®). The user computing device preferably is a portable computing device that the user brings with the user to the retail banking facility to make transactions at the facility. The user device preferably is a communication enabled interconnectable device (e.g., such as, for example, a smartphone, connectable through Bluetooth® or other protocol), and which is recognizable by the retail banking establishment sensing and computing components (which may comprise the sensor and circuitry operating the door panel of the deposit box), either through association with the user, or registration of a user device.

In the example represented in FIG. 3, the customer arrives at the facility, block 253, in a vehicle 260, but, according to some alternate implementations, also may arrive on foot, represented by the individual 261, or may depart the vehicle 260 and walk up to a deposit area or slot. The sensor relays the information, block 255, to the computing component or kiosk, block 256. The system, and preferably the computing component or kiosk, block 256, is configured to listen for a detection signal (e.g., from the sensor), and upon confirming the detection of the signal, block 257, communicates with the retail management computer, block 252, through a communication link, which may be a network, VPN, Internet, cellular, or other suitable connection over which information may be communicated. According to some embodiments, listening for a signal (e.g., from a user device in the detection area of the deposit box) may be done by beaconing a signal in order to detect a response from an active user device (which may be done in conjunction with components of or associated with the deposit box circuitry). The retail computing component, block 256, preferably communicates the customer ID to the retail management component, block 252. The customer ID preferably may be a customer device ID based on the sensor detection of the device 251, block 254. Preferably, the customer has registered the device or created another association with the device that identifies the customer. The retail management computer, block 252, preferably has the details of the customer transaction from the prior engagement with the customer when the customer transaction was initiated, block 250. The retail management computer, block 252, preferably identifies the customer and processes the transaction details for that customer, block 268, based on the customer's initiated transaction, block 250. The retail management computer, block 252, preferably is programmed with instructions to communicate to the retail computing component, block 256, at the retail banking facility, instructions 269 for completing the transaction. The retail computing component, block 256, receives the instructions 269 and conducts the retail transaction at the retail banking facility, block 270, which, in this example, includes opening a deposit slot, block 271 to receive the deposit. The retail computing component, block 256, preferably, upon receipt of the communication providing the transaction detail, 269, from the retail management computer, block 252, generates an instruction to operate a mechanism, such as a solenoid, to open a slot door to provide access to the deposit bin. The customer places the deposit (cash and or other materials, envelope, slip, etc.) into the reception access slot, block 272. According to preferred embodiments, a deposit reception access sensor, block 273, may be provided to detect transactional activity, such as, for example, the receipt of materials within the slot or bin. The deposit sensor, block 273, generates a signal that is communicated to or otherwise detected by the retail computing component, block 256. The retail computing component, block 256, may provide instructions to the solenoid to close the slot door after receiving materials within the slot (which may be after a preset time interval, or after providing an option to the customer via the customer device, or input at the deposit area, and receiving no response). Upon detection of completion of the transaction, the solenoid may be actuated to close the slot door. Additionally, or alternatively, the retail computing component, block 256, preferably communicates a transaction status, block 275, to the retail management computer, block 252, to signify that the deposit has been received, and/or that the transaction has been completed. There may be further options provided for determining whether the transaction was successful or was unsuccessful (where nothing was detected being received from the customer). In addition, a recording may be initiated to record the receipt of deposits within the deposit bin, so as to determine whether something was deposited and/or what was provided by the customer. The customer preferably receives an acknowledgement, block 277, from the retail management computer, block 252, (or alternatively, may receive an acknowledgement from the retail computing component, block 256). Upon completion of the transaction, the customer then departs the facility, block 278.

According to some implementations, the system may be configured to detect the presence of a customer 261 (or customer vehicle), block 254, and an event may be created and tagged with a time. This may be done where the customer has a pending transaction to complete, or to identify the presence of a customer who is present at the facility location.

According to some embodiments, the retail computing component, block 256, although represented separately, may be embodied as part of or in association with the circuitry that controls the deposit box mechanism.

The system may be prepared for receiving multiple customers, where the system identifies customers, and may specify an order for transacting with customers, where multiple customers arrive at the same time. Alternatively, multiple deposit slots or transacting components may be provided, and the customer may be assigned to use a particular one of the designated transacting components. Specific facility instructions may be managed at the time the customer pre-designates the transaction (prior to arrival), or at the time of arrival, where a customer device is identified and an instruction is provided to make the transaction at a particular (or other) transacting component at that facility (e.g., deposit box slot 1 versus deposit box slot 2). Although the exemplary depiction in FIG. 3 describes the retail computing component, block 256, communicating an ID to the retail management computer, block 252, and then receiving transaction details, block 268, the transaction information 269 may be uploaded, downloaded, or pushed from the retail management computer, block 252, after or while carrying out the initiation of the transaction, block 251. The retail computing component, block 256, may already have the customer information and transaction information prior to the customer arrival at the retail banking facility location, so that when the customer device is detected, block 254, and the ID is relayed, block 255, to the retail computing component, block 256, the retail computing component, block 256, may implement the facility portion of the retail banking transaction, block 270. In addition, although the customer is shown receiving a completion or transaction status, block 277, from the retail management computer, block 252, in addition or alternatively, the retail computing component, block 256, may generate and provide information to a transacting customer, such as, for example, a transaction status, which it may communicate to the customer device 251. Upon completion of the transaction at the retail banking facility, the customer account information may be updated to reflect the status of the completed transaction.

Alternatively, customer account information may be separately managed by components outside of the deposit facility that receive a confirmation of deposit details.

According to an alternate embodiment, the pre-transactional initiation may be carried out using the transacting user's computing device which may connect to the retail management computer, block 252. The transactions may be implemented and completed at the retail banking facility location, through a connection between a computing device of the transacting user and the retail management computer, which interchange information. According to some implementations, the retail management computer, block 252, may issue a signal to the retail computing component, block 256, to operate components at the retail banking facility, such as, for example, a control mechanism that opens the slot door to accept a deposit, and/or closes the door or prevents the door from opening.

The examples illustrated in FIGS. 1, 2, and 3 represent examples, and, according to some alternate configuration, the sensor communications may be provided or exchanged directly or indirectly with any one or more of the management computing devices, such as, for example, the host 170, establishment computer 180 and/or provider computer 190 of FIG. 2, or a retail management computer 252 and/or retail computing component 256 (FIG. 3). The sensor preferably identifies the user device within the sensing area, and the system carries out processing of the device identification to allow a confirmation of the transaction.

Figure 4:
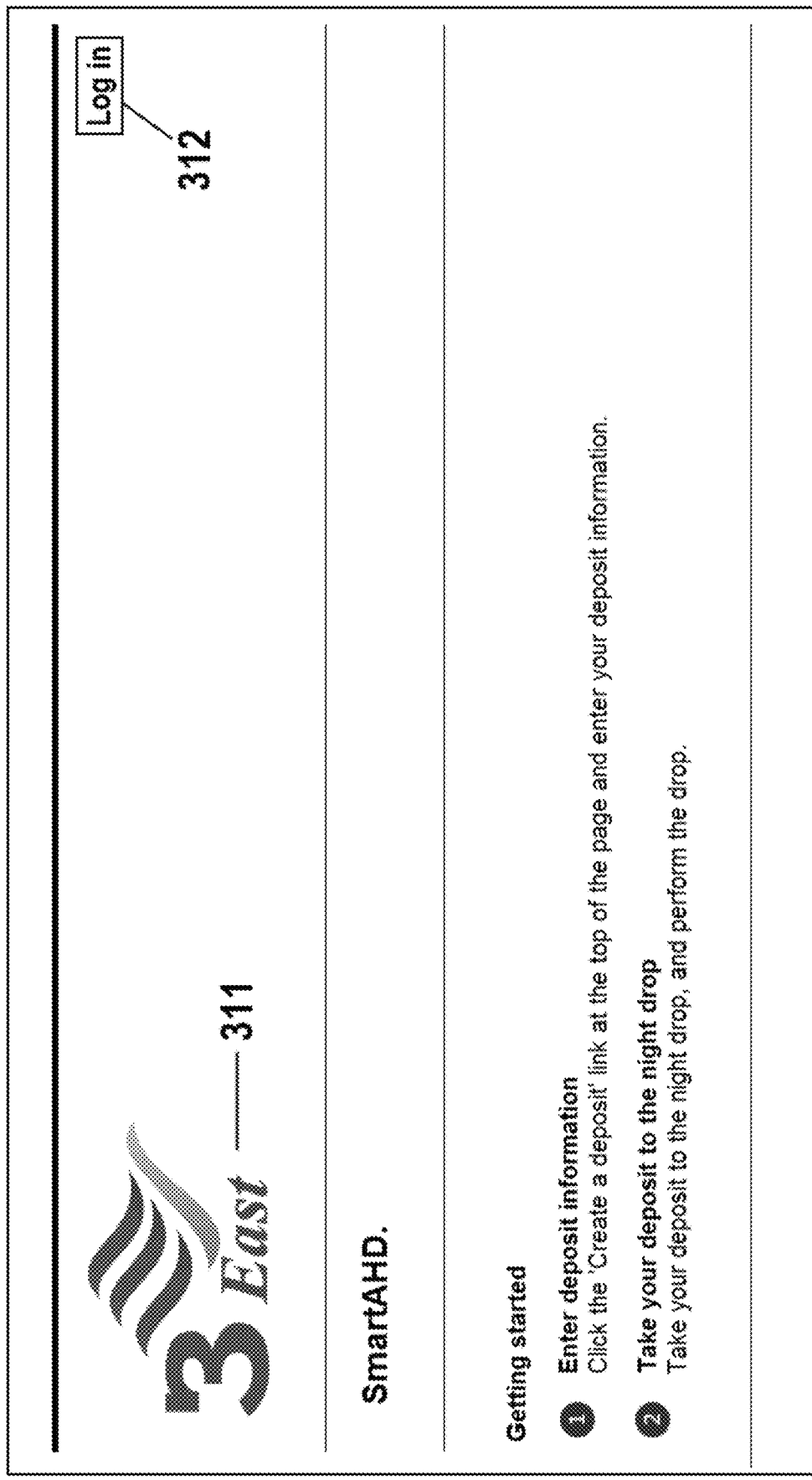
Figure 5:
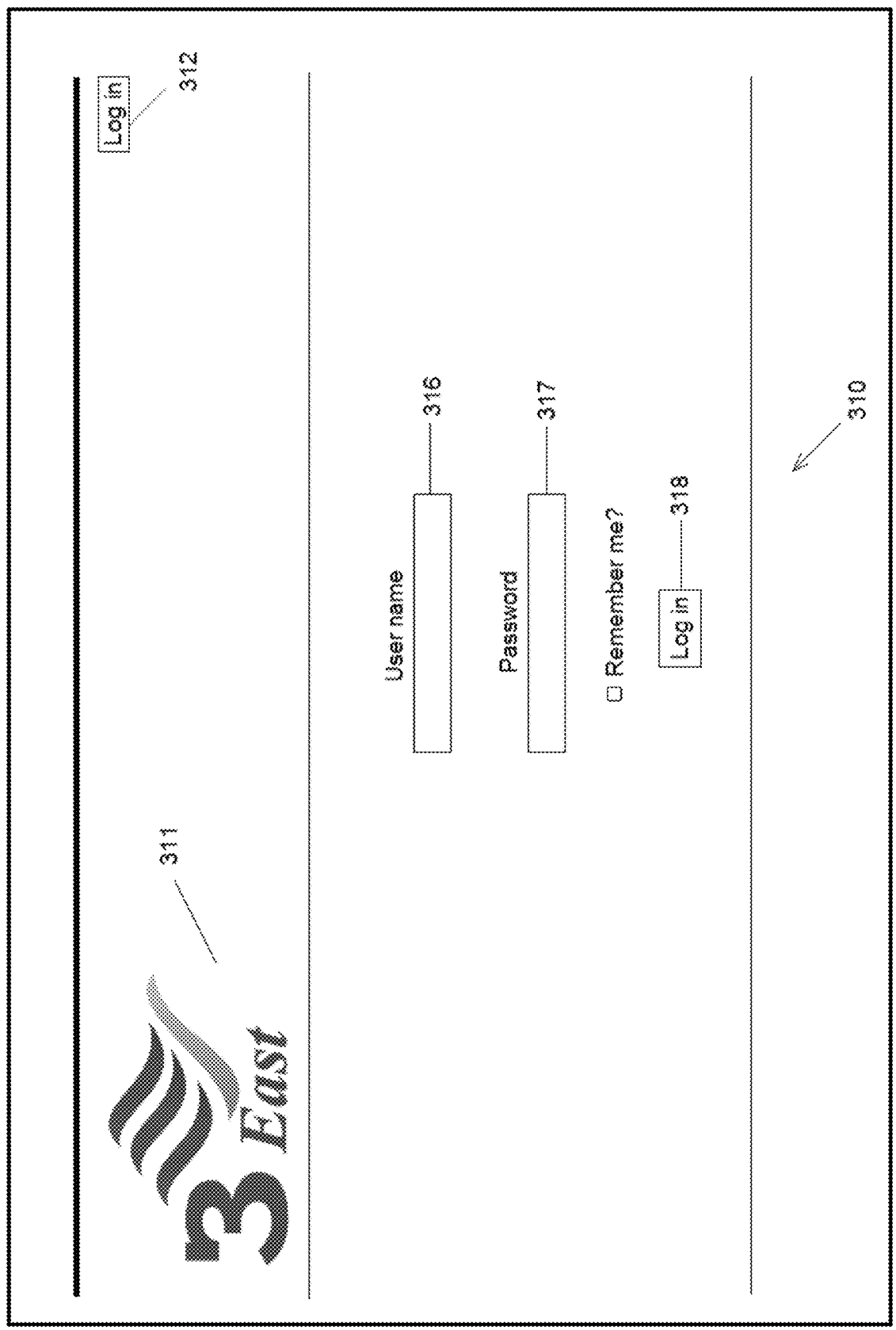
FIG. 5 is an exemplary screen shot showing a home screen displayed for a customer log in, where the log in is selected and boxes are displayed in which a username and a password may be entered.

Referring to FIGS. 4, 5, 6, 7A, 7B, 8, 9 and 10, screen displays are illustrated showing screen shots of pages generated on an electronic display, such as, for example, a monitor, smartphone, personal digital assistant, tablet, laptop, or other computing device. The screen displays preferably are generated by software containing instructions to provide graphics and to display information for transactions and accounts. In the exemplary depiction illustrated, as shown in FIG. 4, a screen display 300 is generated and presents the company name and/or logo 311 shown with a "Log in" indicia or button 312 appearing thereon, which in this example, is at the upper right portion of the screen 300. Selecting the "Log in" button 312 displays log in boxes for a user input. For example, as shown in FIG. 5, a user may enter user credentials at the log on screen 310. The user credentials, for example, may comprise a user name and password combination which may be entered in the respective locations or boxes 316, 317 provided on the log on screen 310, and confirmed or entered by the user selecting the "Log in" selection button 318.

Alternatively, or in addition to the password, one or more user credentials may be used to verify the user, such as, for example, a biometric reader (fingerprint, eye/retina scan, DNA, and the like), which may be provided in conjunction with one or more devices used to generate the display.

Figure 6:
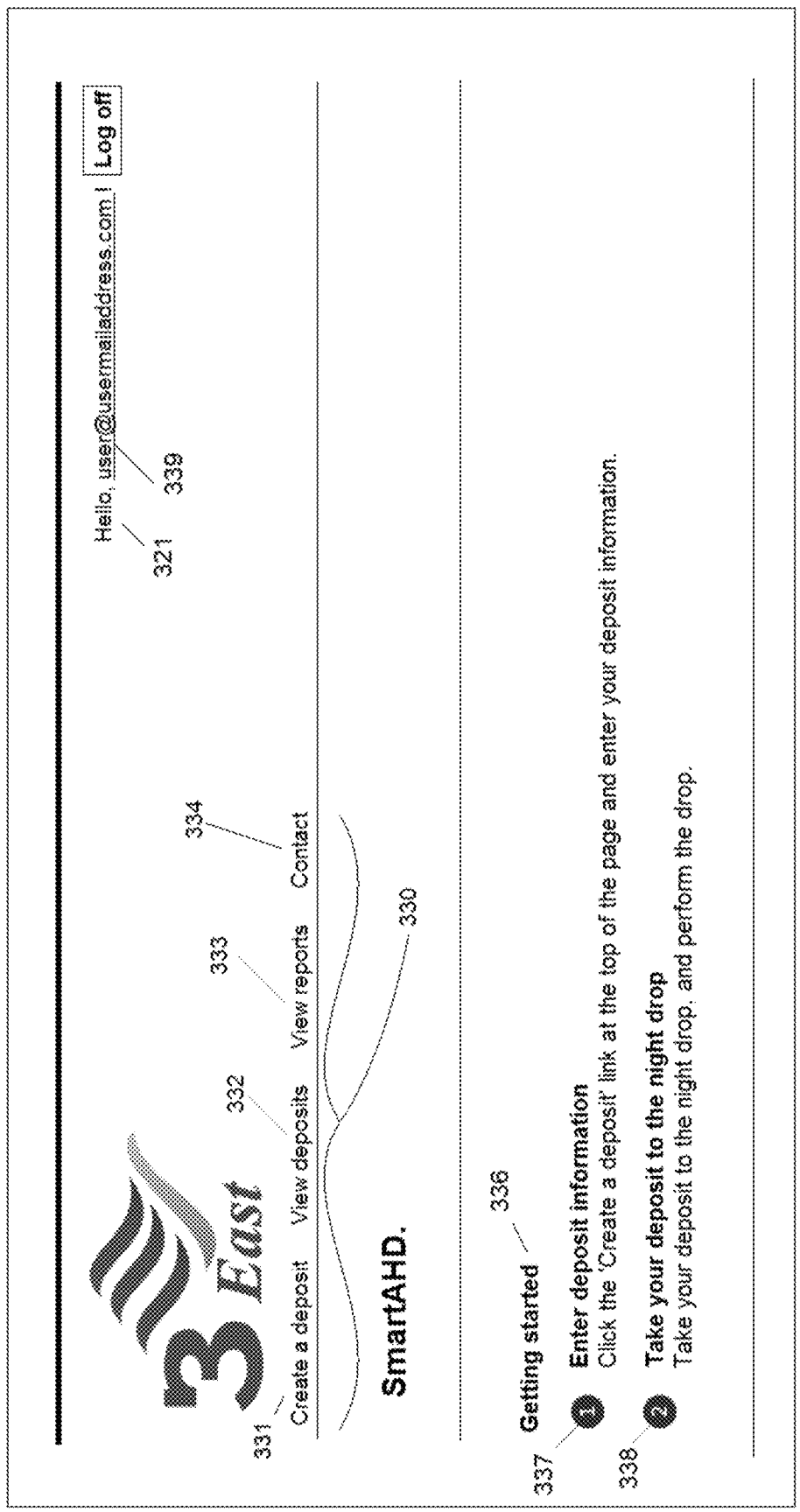
FIG. 6 is an exemplary screen shot showing a screen display generated for a user that has logged on to the system.

Once the user has successfully logged on to the system, a user log on confirmation 321 appears (shown in the top right corner) of the screen 320 (see FIG. 6). The screen display for a user that has successfully logged on to the system preferably provides selection options for conducting a transaction, as well as other options. As shown in the exemplary screen display 320 of FIG. 6, a plurality of menu options 330 become active for a user that has logged on. For example, according to the exemplary depiction shown, the system displays menu options "Create a deposit" 331, "View deposits" 332, "View reports" 333 and "Contact" 334. Other features of the system may be provided in one or more additional menu options, which may appear on the main display screen (e.g., as part of the main menu 330), or in one or more sub-menus which preferably may be accessible from selecting and activating one of the menu options. Information, including directions or other indicia may appear on the display screens, as shown for example, on the screen 310, where instructions are provided, which in this example is under "Getting started" 336, including a first instruction 337 to enter deposit information and a second instruction 338 indicating to take the deposit to a night drop and carry out the drop.

According to preferred embodiments, the user log on 321 is confirmed by an indication on the display 320, which, in this example, shows the username 339 (the user's email useremail@useremailaddress.com), as well as a greeting "Hello".

According to some embodiments, the system may be hosted and operated by a commercial establishment, such as, for example, a financial institution, using the data centers that the financial institution provides for receiving and storing customer account and transactional information. For example, the financial institution may receive inputs from the host and then the financial institution may process the inputs. Alternatively, the financial institution may utilize a core processor (which may be another party) that handles the customer data transactions, and in such cases, the hosting system may report the transaction information directly to the institution or establishment's core processor. The inputs obtained and communicated, for example, may comprise customer identification, such as customer name and customer account number (or numbers) that are designated to receive the deposit (or deposits), and also preferably includes transaction details, such as the location of the drop, the amount or amounts and types of transactions (e.g., night drop at $45^{th}$ and Elm, City, State, zip code, cash of $4000, check of $5000.00, or other designations). The drop location may institute rules such as one drop per account, or require or request as a preference, that the depositing customer use separate envelopes/containers for each account. Alternatively, the system embodiments may be configured to provide customer case of use, where a customer may deposit mixed transactional deposits, such as cash, checks, food stamps, money orders or other items of currency or tender, and may specify one or more accounts to receive the deposits.

According to some preferred embodiments, the commercial establishment, such as the financial institution in this exemplary embodiment, may set the frequency or time for updates to be transmitted from the host and/or processed. Where, for example, the transactional information is generated by the hosting system, the host system may retain the transaction information and transmit the information at a designated time. According to one example, the host may conduct and record transaction details for transactions at various locations during the evening night drop hours (for example from closing time at a branch until a designated time, e.g., time 0400). The host may then transmit the transaction information to the financial institution at a subsequent time 0415. The financial information may receive the transaction information as a series of transactions, or a transaction file which provides an organization of the information that may be read by the financial institution system and may be processed for integration with customer accounts. Since the transaction involved a deposit at a branch location, the transaction may be provide with a status by the financial institution until the financial institution branch has had an opportunity to report or confirm the transaction details with the physical deposit. For example, the system may include a feature operated at the branch location, which may be configured to connect with the financial institution system or may be linked to the branch location to enter information on the remotely situated financial institution computer. Alternatively, the branch location may be configured to provide a confirming entry to the host platform, and the host computer may transmit the confirmation to the financial institution, which may be in the next scheduled information transfer, immediate, or at some other designated time interval or occurrence.

In the embodiments illustrated, the commercial establishment, such as the financial institution in the examples herein discussed, may maintain and secure the customer information. According to some embodiments, the communications preferably are encrypted, so that the deposit transactional information is encrypted when it is communicated to the host and when provided from the host to the financial institution. Alternatively, the commercial establishment, such as, for example, a financial institution, may operate as a host, and may configure the transacting system to coordinate with other systems used by the establishment or institution to provide transactional details and information and provide that information to the customer account.

The commercial establishment, such as the financial institution, may be configured to receive the hosted transactional information and provide provisional status for the deposit until it is confirmed by the local branch. The confirmation of the physical deposit may therefore be associated with the status indicator to modify the status to make cash (or other immediate funds, e.g., money orders) available immediately, and to make checks available per any current banking rules (e.g., for domestic checks, foreign checks, and the like).

The system preferably includes transacting hardware at the facility location, such as deposit hardware that is situated at the local branch where deposits are expected to be made. In the case of a banking establishment implementing the system, method and devices herein, the deposit hardware preferably is provided at a plurality of branches that are designated to receive deposits for the hosted system. According to a preferred embodiment, the system is configured with hardware that operates a deposit mechanism so that a deposit of physical materials (cash, checks, coins, food stamps, or other tender items) may be received through the deposit acceptance opening and secured in the deposit area within the local branch. The deposit acceptance opening preferably is closed using an actuator that prevents the access opening from being accessed. According to some embodiments, a closure or door selectively blocks the access opening. The closure or door may be regulated to limit access, and provide access to the deposit acceptance opening when a transaction is taking place. According to one embodiment a low energy transmission component is situated at the deposit location and is configured in a circuit to sense the identity of a depositing user. The identification of the depositing user preferably is carried out by providing a low energy signal to the depositing user's smart device (e.g., such as, for example, the smartphone). According to a preferred embodiment, Bluetooth® may be utilized as the communication mechanism for the deposit box and the user smart device to engage in the recognition. According to a preferred embodiment, a solenoid is provided to regulate the opening of the closure. Upon recognition of the transacting user, which in this example, preferably, is carried out using the identity from a user smart device, e.g., the user's smartphone, the solenoid is actuated to reveal an opening of the deposit box. The deposit hardware may be configured to recognize the user smart device via the low energy signal. According to some preferred embodiments, a phone interface is provided to engage in a recognition transaction (such as a communication) that identifies the user. The interface may comprise software which may be downloadable for use offline that identifies the user. The system therefore provides the capability for a user to make a deposit remote from locations where the user is able to connect its smart device to a communication network. The user preferably may register its phone in its user profile or account information to associate the smartphone (or other smart device that the user carries to the deposit location).

According to some embodiments, the deposit hardware is configured with a sensing circuitry that preferably is linked to engage in a communication to identify the smartphone by a unique identification. The user interface of the smartphone may include an application that provides the user with an opportunity to identify the user with a biometric scan (fingerprint reader of the phone), or a scan of a QR code or a sticker, or a geolocator.

The system may be configured to send a receipt of the transaction. This may be done using the application interface, wherein the transaction details record the time and deposit confirmation (that the access closure was opened at that time). The user receipt may be communicated to the hosting system, or the user (through the low energy interface at the deposit location, or through a network connection from the hosting system). The receipt preferably may be configured with a geolocator tag, which preferably identifies the deposit location (which may be the branch location of the establishment or facility). According to a preferred embodiment, the location may be carried out using mapping software in association with the user smart device. For example, the user smartphone may be configured with an application programming interface that populates the location with a map program, such as google maps, for the location of the phone (or smart device) at the time of the transaction (deposit).

Preferably, the user may identify the transaction details, including for example, a deposit associated identifier, such as a bag number of the bag that contains the deposit or pre-numbered envelope, and the customer account number (for the deposit to go into). Some embodiments may use user prepared (i.e., numbered) envelopes or deposit containers. The user therefore may enter the transaction details from any location. The transaction details that the user may provide preferably may include the customer name, account number and deposit information, as well as bag number (if provided), or type of deposit (envelope). The user preferably may input this information through a connection over a network, e.g., through a secure connection over the Internet, to the establishment's computing system or to the provider of the establishment's system. The remote system of the establishment therefore has the information of the user transaction. The user then proceeds to a branch location, and carries out the deposit transaction at the location by undergoing the identification requirements to be provided access to the deposit access opening, and entering the deposit through the access opening.

Figure 7A:
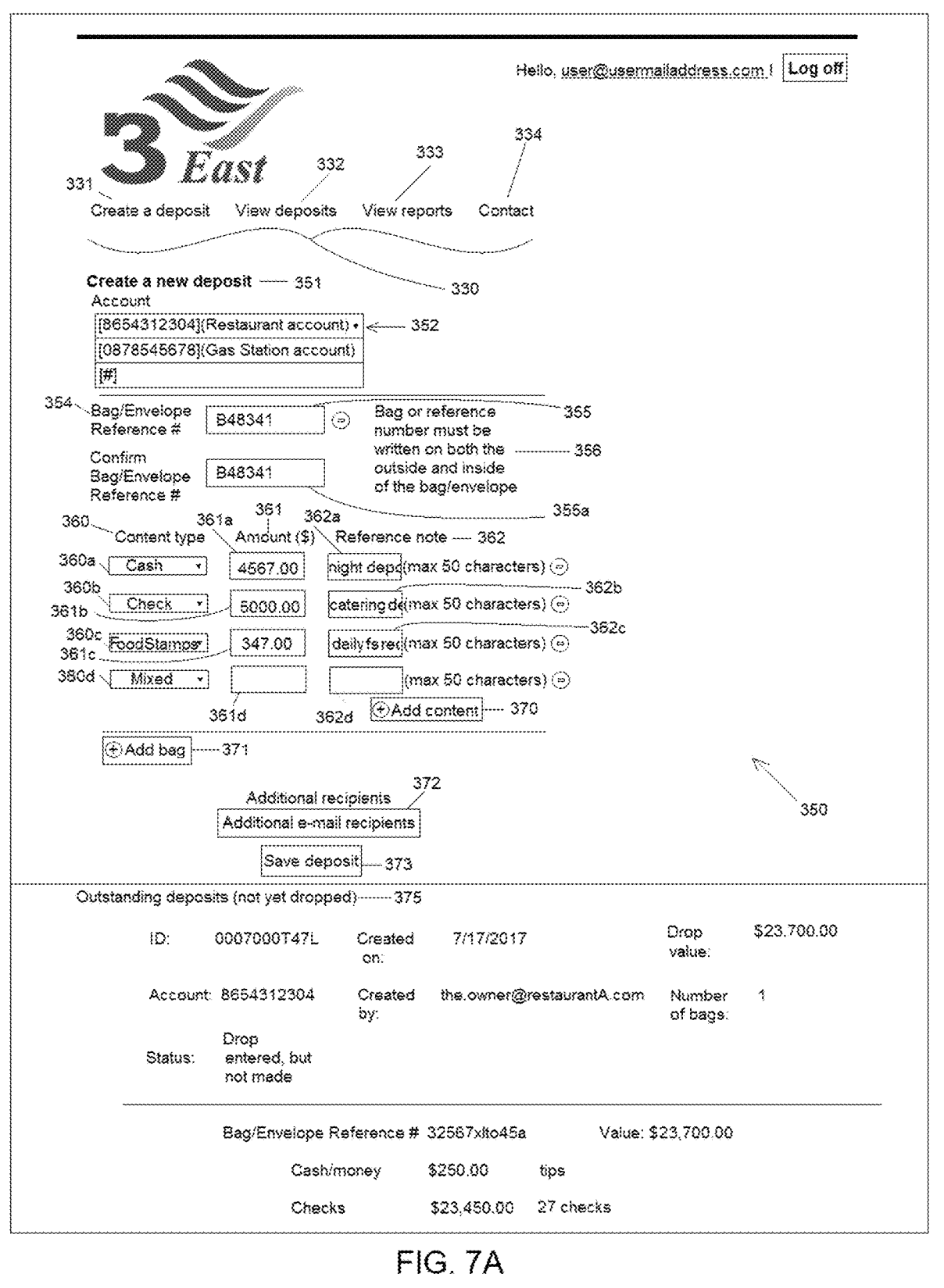

Referring to the exemplary screen display 350 shown in FIG. 7A, a user is logged on to the system as indicated on the log on status 321 appearing at the top of the screen 350. The logged on user may select the menu option "Create a deposit" 331 (from screen 320 of FIG. 6), and, as depicted in the screen display 350 of FIG. 7A, the system generates prompts to accept deposit transaction information from the user. For example, as illustrated in FIG. 7A, the screen display 350 provides a prompt for the user to "Create a new deposit" 351. An account selection menu or window 352 is provided, and preferably lists one or more accounts that the user may select for the transaction. The account selection menu 352 may comprise a window or drop down menu listing available accounts. The user accounts selections may be those which a user and its financial institution receiving the deposit have designated or approved for the transactions (after hours deposits). In the example illustrated, the user has selected the "Restaurant account" 353, keyed to account number 8654312304 appearing in the selection window 352. The system is configured to receive an input of a reference for the user deposit. In the exemplary depiction shown, a "Bag/Envelope reference #" indication 354 is provided with an identification window 355 for the user to input information identifying the container that will be deposited. In this example, a bag or envelope is used, and has an identifying number (B48341), which the user inputs into the bag identification window 355. A second confirmation window 355a may be provided for the user to confirm the entry in the first window 355. The system preferably processes the inputs and if the inputs do not match, or if the inputs are not in the proper format (for a pre-designated bag or envelope), the system may prevent the user from continuing. Instructions, such as, for example, the bag/envelope instruction 656, may be provided to direct and guide the user as the user makes inputs and navigates through the screens. The establishment may provide the user with a deposit container, such as, for example, pre-numbered envelopes and/or bags, or alternatively, the user may use the user's own deposit container. The new deposit information includes the "Content type" 360, the "Amount ($)" 361 and a "Reference note" 362, which are labeled to correspond with input boxes, respectively 360a, 361a, 362a. Once the user inputs transaction details, the transaction is entered by selecting an enter button, which in this example, is the "Add content" button 370. According to preferred embodiments, the content type may generate another set of boxes similar to those 360a, 361a, 362a, to permit a user to add additional content types (e.g., checks) to the same deposit (making it a mixed deposit of cash and checks, in this proposed example). The user may add additional deposits, with the selection of the "Add bag"

button 371. The system also provides a notification feature, which allows for notifications via email, text, or other communication type, including pre-designated communication addresses or numbers, as well as providing the option for the transacting user to include additional recipients. In the example illustrated, the additional recipients are notified by entering an email in the recipient email input box 372.

In the exemplary depiction shown in the screen display of FIG. 7A, the selection options for a transaction are shown, and indicate a transaction that includes a deposit of cash, check and food stamps. The "Content type" boxes 360*b* and 360*c* receive a user input to provide respective indications of a check and food stamps. The "Amount ($)" boxes 361*b* and 361*c*, provide the respective amounts of the check and food stamps, while the "Reference note" boxes, 362*b* and 362*c*, respectively, accept a user input to indicate a note, "catering deposit" and "daily fs receipts". The boxes shown may receive user inputs of free text, and alternatively, may receive a fixed selection from which to choose (e.g., cash, check, food stamps), or combinations of free inputs and selections for some boxes. According to some embodiments, the user may designate a transaction amount that includes a total amount of a mixed transaction, which may be cash and checks as well as other items, money orders, food stamps or the like. For illustration purposes, in FIG. 7A, the screen display also shows an input box 360*d* in which the content type is "Mixed". The mixed content amount may be input in the amount box 361*d*, and notes placed in the box 362*d*. The user may continue to add contents to the transaction by selecting the "Add content" button 370, and when the user desires to complete the addition of the content and amounts entered, the user may select the "Add bag" button 371.

Once the transaction or transactions have been input through the system, such as through the prompts depicted on the screen 350, the user may save the deposits, by selecting the "Save deposit" button 373, as shown in FIGS. 7A and 7B.

Referring again to the screen display 350 of FIGS. 7A and 7B, according to preferred embodiments, when creating a new deposit at a "Create a deposit" screen (e.g., screen 350), a listing of prior transactions may be displayed, along with a status indicator. For example, in the exemplary depiction shown in the screen display 350 of FIGS. 7A and 7B, a heading "Outstanding deposits (not yet dropped)" 375 is shown, and below the heading 375 are listings of transactions. For example, a transaction listed may include a transaction identification number (which may be assigned to each transaction entered by a user), the transaction entry or creation date, as well as the account number, the amount or value of the drop, the number of containers, and the individual who created or generated the transaction (e.g., the username or other identifier). Information about the type of deposit also may comprise the record, such as, the number of bags/containers, the bag or envelope reference identification, the deposit value, as well as the breakdown of the deposit, amount of cash, amount of checks, number of checks, as well as other items of the deposit (money orders, etc.).

Referring to FIGS. 7A and 7B, where a listing of deposits is shown, according to a preferred embodiment, the user has the option to delete the transaction (delete button 385) or email the transaction particulars (email button 386).

Figure 8:
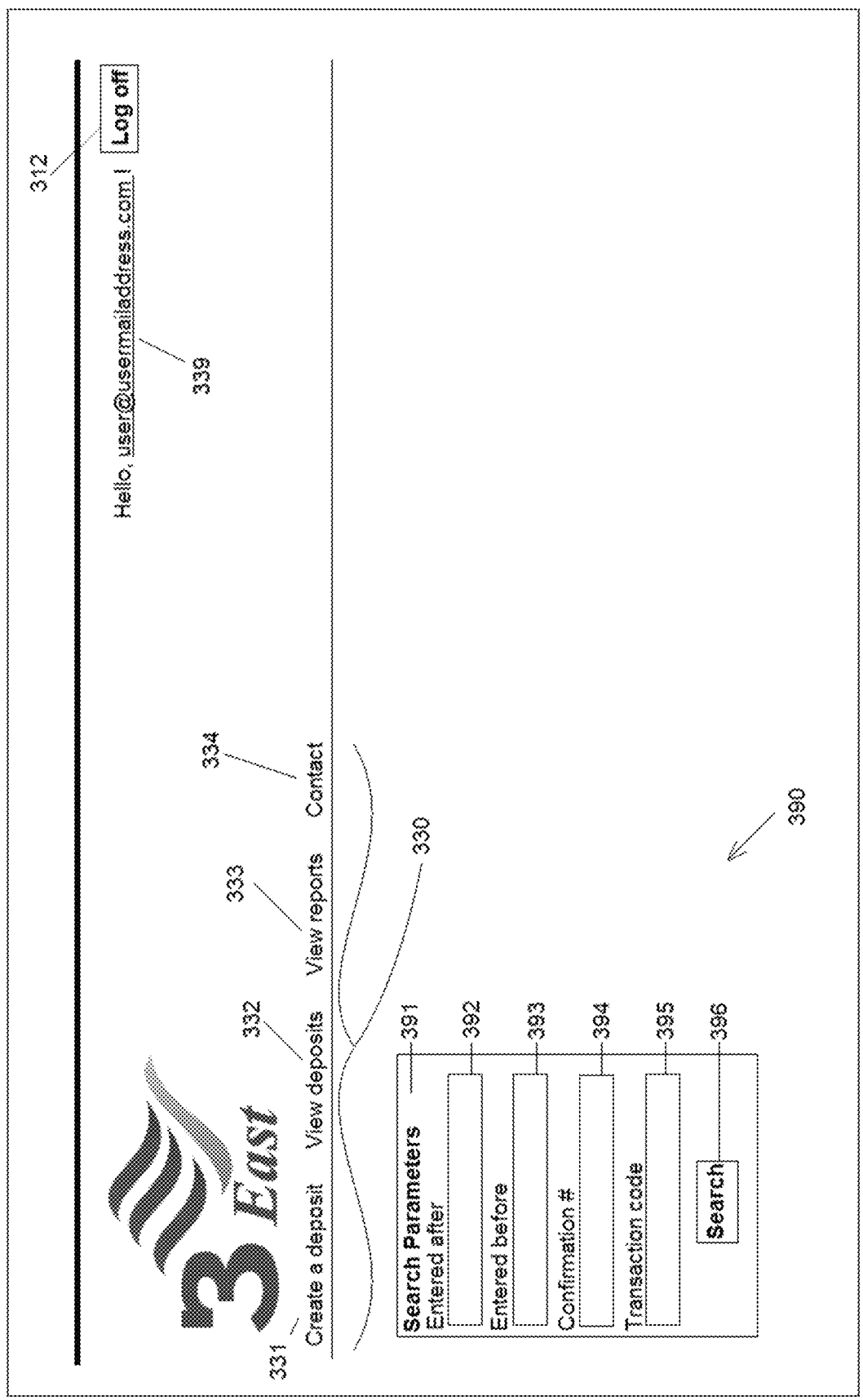
FIG. 8 is an exemplary screen shot showing a screen display generated for viewing deposits, configured with search options.
Figure 9:
FIG. 9 is an exemplary screen shot showing a screen display generated for viewing reports of transactions.

Preferably, the user may track deposits made, and, according to some preferred embodiments, deposit history remains available to a user. The user may import the deposit history for downloading (e.g., to a spreadsheet). The download history preferably may be viewed. Referring to FIG. 8, as illustrated in an exemplary screen display 390, the "View deposits" 332 when selected, may provide options for viewing deposit transactions, which may include pending and completed deposits. For example, the screen display 390 provides "search parameters" 391, and a number of search box options for searching by different parameters of the transaction, such as, for example, a date of entry, before 392 or after 393, a confirmation number 394, and a transaction code or id 395. Once the information to be searched is input the search button 396 may be selected to produce a transaction listing. An exemplary transaction listing appears in FIG. 9, showing transactions.

Figure 10:
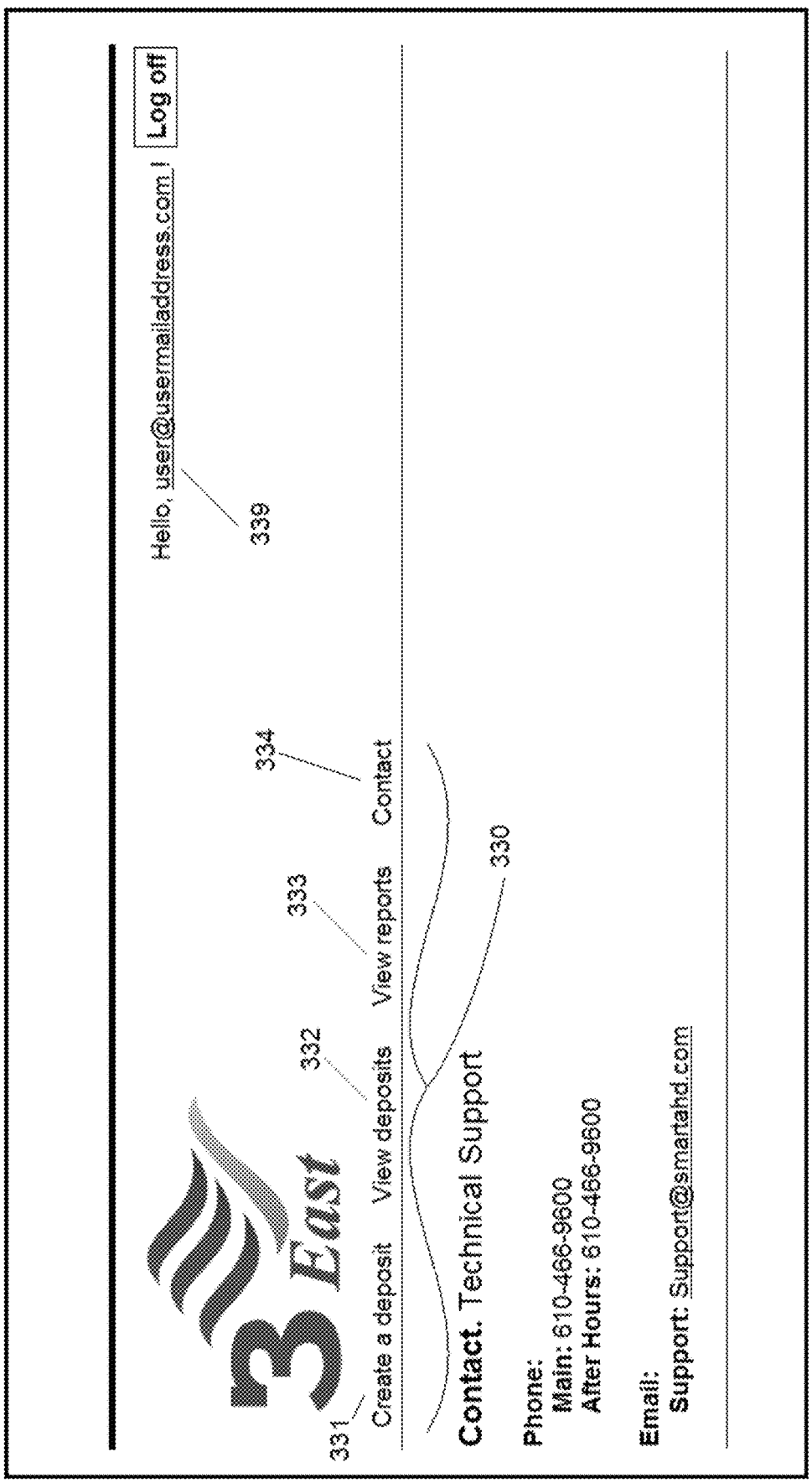
FIG. 10 is an exemplary screen shot showing a screen display generated that provide contact details.

Referring to the screen displays 320, and 350 of FIGS. 6, 7A, 8 and 9, a "Contact" selection 334 preferably is associated with technical support to assist users making deposit transactions, and may, for example, provide a contact screen display 410 shown in FIG. 10, which may include a telephone number, email, or other support options. In some instances, technical support may be 24 hour support, or may be limited to after hours or a window around the after hours facility hours, so that transaction assistance may be provided before the actual visit to the deposit location.

The system may be configured by providing a new installation of a drop container mechanism at the local branch or facility to receive the deposit, or may be configured to use the location of a prior deposit device, such as a drawer which may be configured with a regulating mechanism (for example, such as the regulating mechanism 120 shown and described herein).

The system may be configured to provide mechanisms for generating a user interface that may be used for the transaction, with the hosting party, the establishment, and/or a provider for the establishment.

Figure 11:
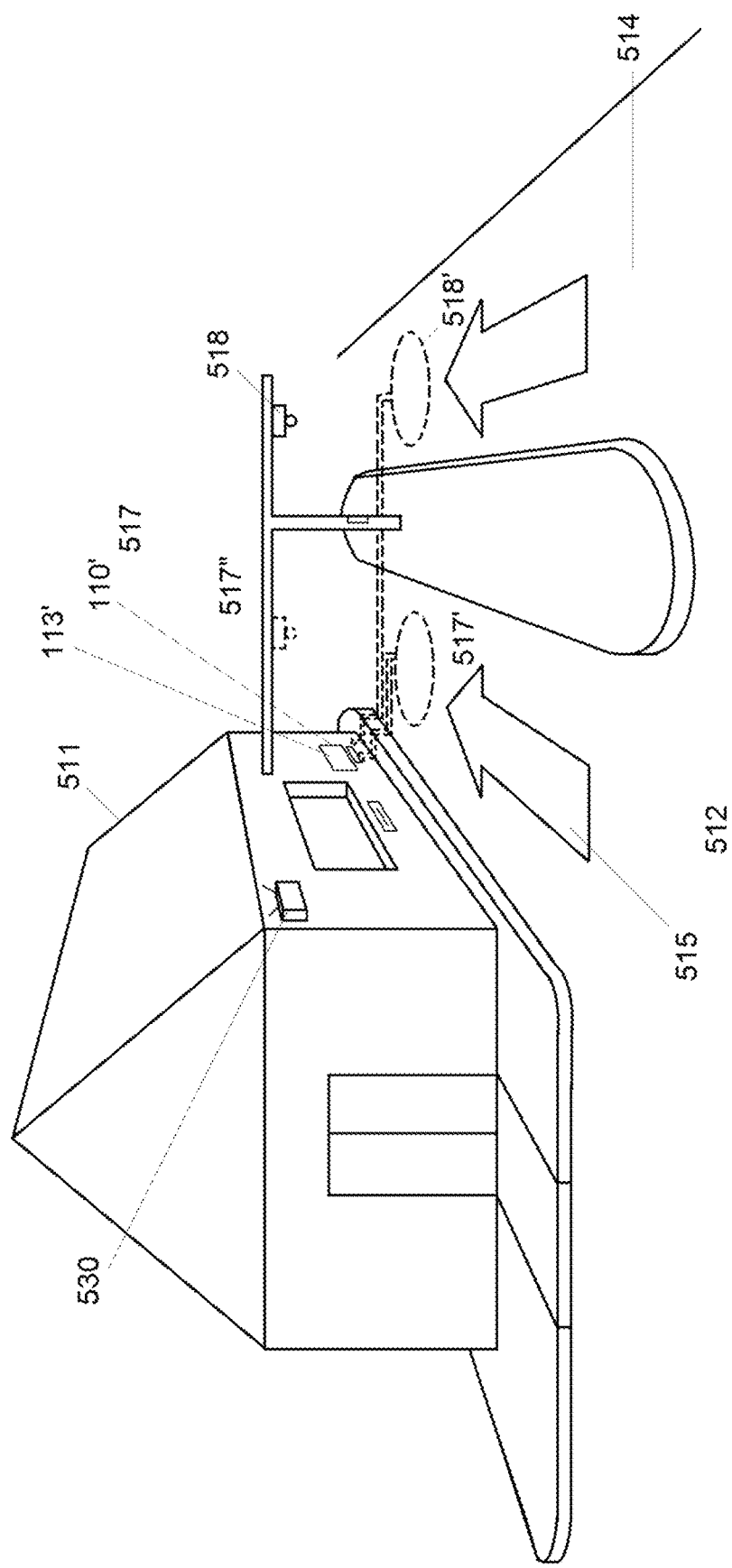
FIG. 11 is a schematic illustration showing a drive up lane configured with a deposit box.

According to some alternate embodiments, the deposit box may be configured for use in conjunction with a drive up lane for deposits to be made from a user vehicle. In these alternate embodiments, as shown in FIG. 11, where a schematic illustration includes at least one first or proximal drive-up lane 512 which passes adjacent to a deposit box, such as the box 110', which preferably may be similar to the deposit boxes shown and described herein (e.g., 110), with the regulating mechanism and sensors for detecting a user using the transacting system, e.g., to make after hours deposits at the facility 511. An arrow 515 identifies the direction of vehicle traffic in the respective lane 512. The arrow 515 may be painted on the roadway comprising the lane 512, or alternately, may be omitted. Although illustrated in an arrangement with a single lane, drive up lanes and configurations may be installed and constructed in accordance with local, state and federal laws, rules and other regulations that apply thereto. The system preferably includes a sensor provided in conjunction with the deposit box 110' to detect a user device within the sensing range, when the user is in the lane with the user device. One or more additional sensors may be provided, such as, for example, sensors that detect activity or the presence of objects, such as a vehicle in the lane, such as, for example, a vehicle sensor 517'.

According to some embodiments, the sensor 517 may be provided to communicate through a short-range wireless interconnection protocol (e.g., Bluetooth®) to interconnect with a computing device of a transacting user. As discussed herein, the user computing device preferably is a portable computing device that the user brings with the user to the retail banking facility to make transactions at the facility. The user device preferably is a communication enabled interconnectable device (e.g., such as, for example, a smartphone, connectable through Bluetooth® or other protocol), and which is recognizable by the retail banking establishment sensing and computing components (e.g., the sensor and computers), either through association with the user, or registration of a user device. The sensor 517, as with the sensors described herein, may be shielded or range limited to detect users, which may limit the range to the lane or within a discrete transacting area of a particular transacting location or portion of the lane (so as to prevent or minimize inadvertent detection beyond the desired area). According to some embodiments, a camera or image sensing based device also may be provided as an additional component or in association with the sensor 517. For example, a sensor 517 may be configured to continuously detect or beacon for nearby user devices, or, alternatively, according to some other embodiments, the sensor 517 may be actuated upon an event, such as a change in a designated camera's field of view, such as an area within a lane 512 which is within the detection range (e.g., field of view of an alternative sensor 517', e.g., induction sensor or camera—when a vehicle enters the detection range of the secondary sensor 517' (e.g., induction loop or camera field of view), the software on a computing component, such as a computer or kiosk, recognizes the (standard/typical) camera's field of view change and may actuate the deposit box sensor 517 to detect user devices in the detection range of the sensor 517. The deposit transaction may be carried out at the deposit box as shown and described herein, where the customer user makes a deposit of funds (cash, checks, and the like) for which a pre-designated transaction has been initiated prior to making the deposit.

Alternatively, a vehicle sensor according to some preferred embodiments may be embedded in the pavement of the lane 512 as illustrated by the secondary sensor 517', and may be used in conjunction with the deposit box sensor 517 that engages in a communication with a user device. According to some other embodiments, the sensor, such as the sensor 517 may be provided with or in association with the deposit box, such as the box 110' shown in FIG. 11. The secondary sensor, such as the secondary sensor 517''' may use a beam type of detection, radar, infrared, or other suitable detecting component. In the embodiment illustrated, a deposit box 110' is provided on the structure 511, and has an access opening 113' at a level where a driver vehicle window would be situated.

The deposit box sensor 517 may be powered with a suitable power source, such as a battery, or a direct wired low voltage power source (connected to the facility's power supply), or combinations thereof (e.g., wired with a battery backup, or a rechargeable battery). The optional secondary sensor 517', when used, preferably may be powered with a power source, which may be wired or otherwise connected to the facility's power system or supply. According to some preferred embodiments, the sensor 517 is configured as a low power short range wireless sensor configured to detect active devices that are operating using a compatible communication protocol. In addition to the sensor 517, a secondary sensor, such as the sensor 517', may be configured as a vehicle loop and/or loop detector (depicted in broken line representation in FIG. 11, which preferably is installed beneath the surface of the lane). The sensors 517 and 517' preferably are capable of detecting respectively, a user device or the presence of a vehicle in the location. Alternatively, where a vehicle itself has circuitry and transmission components, the vehicle may be identified through the vehicle circuitry. For example, according to some embodiments, a secondary sensor 517' may be configured as an in-ground loop detection unit, magnetometer, or the like, which preferably have adjustable capabilities for adjusting the sensitivity to ensure detection of a vehicle while eliminating false positives. For example, the sensors 517, 517' preferably may be wired to the computing component, or kiosk located at the facility 511. Preferably, the computing component or kiosk is situated within the facility structure 511, as preferably also is the wireless component, or access point 300. In the event wireless detection sensors are utilized on or more access points may be provided within or outside of the structure 511, or the sensors 517, 517' may be wired to a component that connects directly or wirelessly to another component (e.g., network switches, access points, kiosks or computers). The secondary sensor 517' may be provided to comprise a sensor unit with an electronic relay that actuates upon the detection of a vehicle, and where the sensor unit is electronically coupled to the computing component, such as, for example, a kiosk, which is configured with software containing instructions for managing the system, activity, and generating alerts. The signals preferably are communicated through a dry contact relay of the sensor 517' or sensor unit, so that when there is a relay state change for a designated lane, there is a trip of the relay, and that trip is broadcast to the computing component. Alternatively, in the case of video motion detection, the software is configured with instructions to monitor video motion data and recognize when a change of state occurs, and, when it does, commence actions and tasks. According to preferred embodiments, the computing component is configured to listen, which may be to a channel, port or the like, for a signal, which may be the trip signal from the sensor 517' relay. Alternatively, according to some other embodiments, sensors may include a wireless transmission component that is configured to communicate signals. A depiction of a sensor location represented by the broken lines showing sensors 517', 517'' may be used to provide an alternate location for the deposit box sensor. According to some embodiments, one or more of the sensors 517', 517'' also may serve as a detection sensor for deposit box transactions, and may be linked to communicate detection signals to the deposit box operating system or other computers. According to some embodiments, the drive up facility may have a second lane 514, shown adjacent the deposit box lane 512, where other detection of customers and handling of other transactions may be carried out. Detection systems, such as the sensors 518 and 518' are shown.

According to some embodiments, the deposit box may be controlled by a computing component, such as a computer located at the facility or branch where the deposit box is located. According to one embodiments, a computing component such as a kiosk, (e.g., kiosk) configured with software containing instructions to receive and process signals from a sensor (e.g., 127, 517), through a wired or wireless connection from the sensor (or sensor unit) and, based on the detection of activity detected by the sensor, and the corresponding signals, generates a signal that is communicated to the regulation mechanism that controls the deposit box. According to some alternate embodiments, the computing component (e.g., kiosk) may receive signals from a sensor (127, 517) and may be configured to communicate through a network relay, such as, for example, a Wi-Fi access point 530 (FIG. 11), to control the deposit box, by opening the box to allow access for deposits. According to some embodiments, the deposit box circuitry may be provided with computing capability to regulate the access based on the signals from the sensor (detection of a user device). Some embodiments may be configured to regulate the deposit box mechanism with a remote computing component (located remote from the facility) communicating with the sensor which may provide confirmations of user devices permitted to access, and limitations on access (time frame), and the like.

Figure 15:
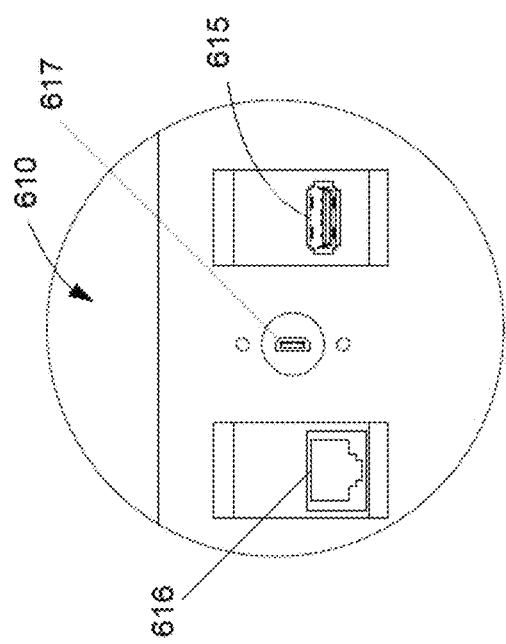
FIG. 15 is a rear elevation view taken of the encircled area 15 of FIG. 13, enlarged to show ports.
Figure 12:
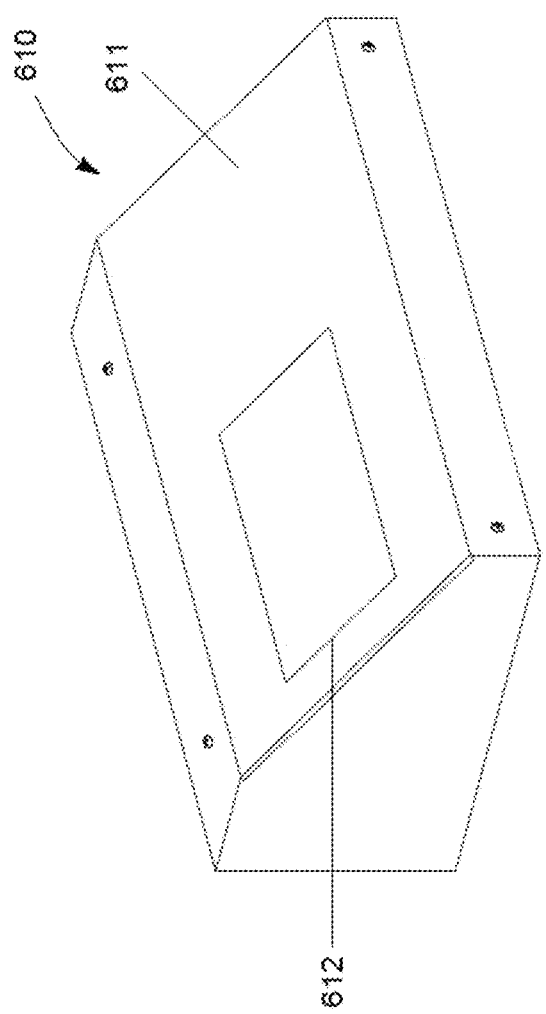
FIG. 12 is a perspective view of a computing component configured as a kiosk.
Figure 14:
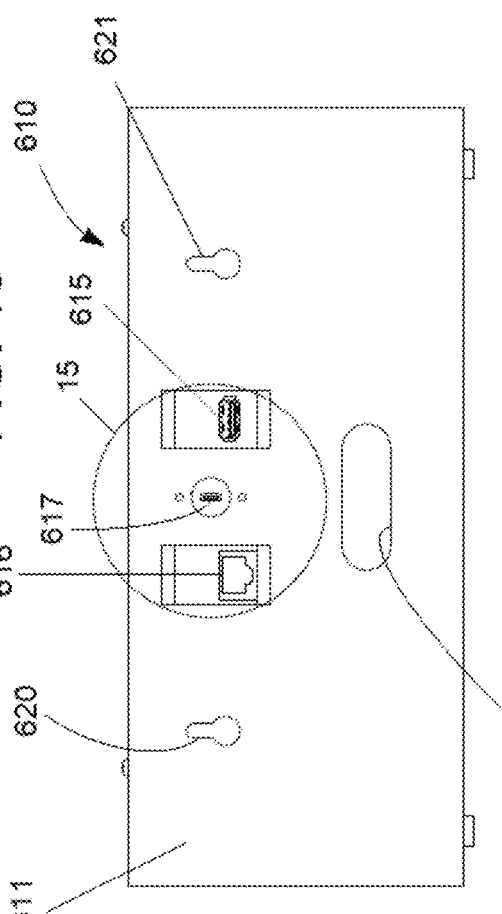
FIG. 14 is a rear elevation view of the kiosk of FIG. 12.
Figure 13:
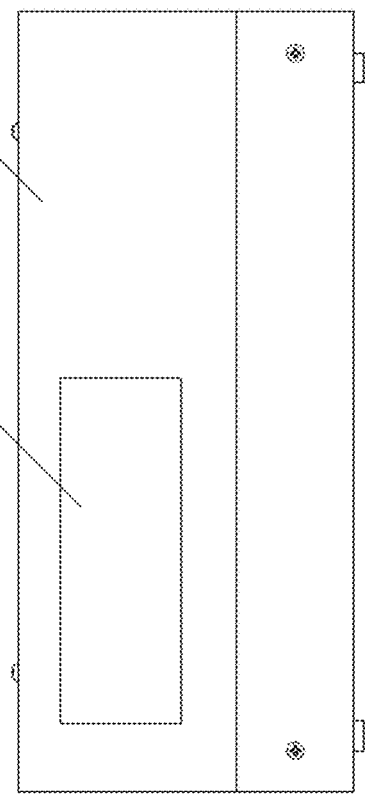
FIG. 13 is a front elevation view of the kiosk of FIG. 12.

According to some embodiments where the deposit box sensor is regulated by a computing component, the computing component preferably includes computing hardware, such as, for example, a processor, storage media for storing information and/or instructions, a power source or connection, a display screen and circuitry to electronically couple the components. According to a preferred embodiment, the computing component may be configured as a computing unit with a display. Referring to FIGS. 12-15, a computing component or kiosk is shown, configured having a housing for housing components, which preferably include one or more processing components, such as, a processor, microprocessor, controller, microcontroller, electronically connected with a storage component, such as, storage media, hard drive or chip containing instructions for operating the system, designing surveys, and receiving, storing and managing transaction activity in conjunction with a deposit box. The computing component or kiosk 610 has a housing 611 and screen display 612. Referring to FIGS. 14 and 15, connectivity ports for connecting with a sensor, wireless access point, network, power supply, or other connection to be made, are provided. For example, the power supply may connect through a micro USB port 617. A network port 616 is shown, and may comprise a network jack. A USB port 615 is provided and preferably may be used to connect one or more other devices, such as, for example, data input devices, video, audio, input devices, such as a keyboard, and the like. Mounting means, such as, for example, mounting holes 620, 621 are shown provided on the housing 611. An opening or slot 623 is shown provided in the housing 611, and may be used for passage of wires to make connections within the unit 610 to components therein. The computing component 610 preferably is configured to generate instructions and transmit instructions to the deposit box (e.g., deposit box regulating mechanism, circuit and/or solenoid), to handle customer transactions at the deposit box.

According to some alternate embodiments, a drive-up lane sensor (secondary sensor) is provided in a drive-up lane and comprises a wireless sensor that is configured to connect with one or more components of the system through a network (e.g., via a wireless access point or computer), and may communicate information to a computing component, such as a kiosk.

The system is configured to be accessed by a customer that desires to make a transaction at the establishment. According to some embodiments, in an implementation where a retail banking transaction is desired at a retail banking or branch facility, the transacting user, e.g., the retail bank customer, may pre-designate the transaction using a mobile device. The mobile device may be the customer's own personal mobile device. In an exemplary embodiment, the mobile device preferably is configured with software that includes instructions that provide the capability for the user to make a selection of a one or more transaction types, and, for some transaction types, to provide additional information about the transaction, for example, the retail branch location at which a deposit will be made. The transaction type selected may be "deposit" and the transaction may include an amount such as $240.00, which may be input on a display of the user's device.

A user device may be linked to communicate through a connection with the retail banking establishment, which may comprise connecting to one or more servers of a retail banking establishment (which may be hosted or maintained by the retail banking establishment or operated by another provider for or on behalf of the retail banking establishment). According to some embodiments, the transaction may be conducted using downloadable software that the user downloads and operates on the user smart device. Alternatively, or in addition thereto, the software may be provided for access as a service, where the user device accesses software remotely, over a communications linkage (e.g., the Internet). The downloadable software application may provide the user with the capability to select transactions and provide information about a transaction from the user's smart device, and may communicate the transaction details (including, for example, the transaction type and transaction information), to a computing component, such as a server, that is being used to carry out the establishment transactions (e.g., making a deposit at a deposit box at a retail branch facility). The retail computing component may be a centralized component, such as a server, and the server may serve one or more locations of the retail banking establishment operating facilities, e.g., one located in Town A, one in Town B, ones located in State C, or any other arrangement. A retail management component, such as a centralized retail server, may communicate with one or more retail computers at the retail bank branch locations.

According to some implementations, the user smart device of the customer includes software that contains instructions for communicating with the equipment at the facility. For example, the sensor may be configured to detect that a customer is present in the sensor detection area, which may be the deposit box location. The sensor preferably is configured to determine the need for a particular transaction by interrogating or receiving a communication from the customer device. The sensor may receive a unique identifier from the customer device that identifies the customer, the customer device or both. According to some embodiments, the sensor is configured to allow the detected unique identifier information (the identification information) to be accessed or transmitted to one or more computing components that have stored on them, or which are able to access, the customer profile. In this example, at a minimum, the customer profile preferably includes the transaction information for that customer. For example, the customer that provided information for a transaction type of a deposit in an amount of $240.00, who is now at the transaction area where the deposit box is located, is identified, and the transaction may be completed by the customer providing the deposit through the deposit box. According to some preferred embodiments, the customer device may be configured to wirelessly communicate information to a sensor of the retail banking location, which may be carried out using a short-range wireless interconnection, such as a Bluetooth® standard. The sensor preferably is located at the deposit box to identify the customer presence. The retail banking location sensor may be a Bluetooth® sensor that can communicate with or receive a communication from the customer device and, according to some embodiments, communicate that information through a network to one or more of the establishment computers, such as a transactional server or other computing component, including a remotely situated computing component, which is remote of the facility or branch location.

The sensor preferably is positioned to provide detection of a proximity region where the customer is anticipated to be located when making a deposit at the facility (e.g., at the location of the deposit box). A sensor preferably is provided having an emitting region that is confined to an area of the deposit box location where a customer is expected to be present with the customer's device. The sensor transmissions preferably may be limited in reach or direction, or may be otherwise shielded or attenuated, to prevent inadvertent detection of consumer devices in other transacting locations, other than the transacting location where the deposit is being made.

The sensor preferably is discrete and therefore may detect activity and record the identities of users based on the transacting user's use of the user's device. In this manner, the transaction may be monitored, and transaction information, including transaction types, time of transaction, and other metrics that are desired to be measured, may be collected and recorded for users of the transacting system. If desired, the transacting information may be collected and/or stored separately from the specific customer transaction, or otherwise managed to comport with applicable privacy regulations or laws.

A sensor also may be provided both, to detect activity sensed within the vicinity of the detector, and to identify the customer based on the use of the customer device and a unique identification provided by the customer device. According to some embodiments, customer device application software may be used to generate the information that is communicated to the sensor. According to some embodiments, the information comprises an identification that uniquely identifies the customer and/or customer device. The customer device application software may be configured to provide the identification upon being in range of the sensor, or upon receipt of a request from the sensor when the customer device is within the sensor range (e.g., at the deposit box).

Figure 16:
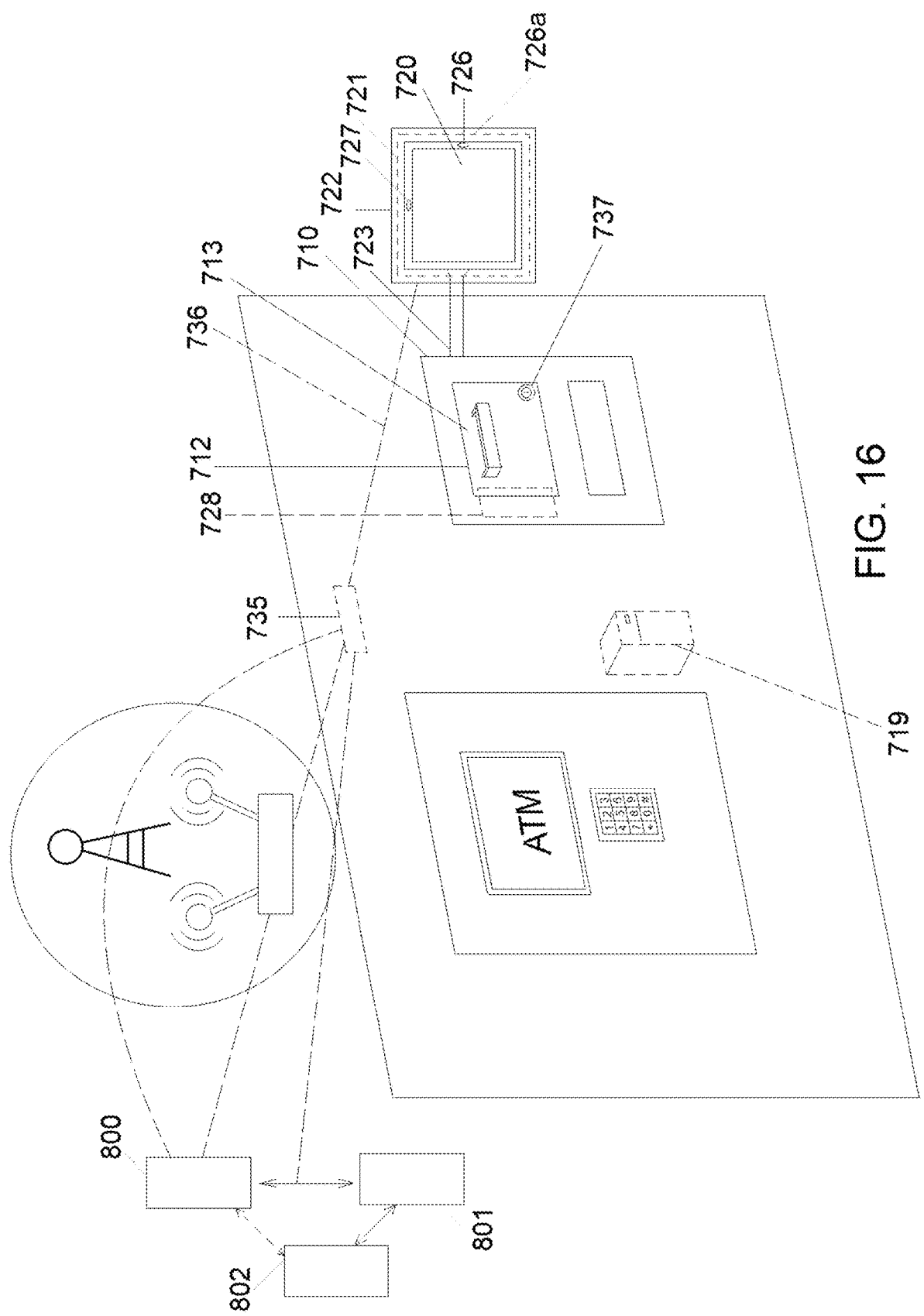
FIG. 16 is a perspective view looking from the front of another embodiment of a depository configured as a deposit box for accepting after hours deposits.

Referring to FIG. 16, there is illustrated an alternate embodiment of a depository configured as a deposit box 710. The deposit box 710 preferably has a regulating mechanism for regulating access to the deposit box interior. The regulating mechanism, represented schematically as the box 728, may be constructed using suitable elements to open the access panel 713 to provide access to the access opening 712 for a user to make a deposit therein. The regulating mechanism 728 of the deposit box 710 may be constructed similar to the regulating mechanism 120 shown and described herein in connection with the deposit box 110. In the embodiment illustrated in FIG. 16, the deposit box 710 is shown installed at a retail banking facility 711 (e.g., a bank branch location), and according to some embodiments, may be provided to be accessed by users who remain in their vehicle while making the deposit. Alternatively, the deposit box 710 (and the box 110) in addition to being installed for drive up use, may be provided to be accessed through a walk up area, and according to some embodiments may be used both for drive up in vehicle transactions as well as for walk up transactions. In FIG. 16, an exemplary embodiment of a deposit box 710 is shown with an input screen 720 which is a screen of a computing device, which in this example, is a tablet 721. The tablet 721 is shown supported in a housing 722 which includes a mounting component configured as a bracket 723 that secured the tablet 721 and housing 722 to the facility 711 (or deposit box structure 710). The tablet input screen 720 preferably comprises a touch screen provided for users to enter information. The deposit box in this example is installed at a facility 711 which is a retail banking facility. The touch pad screen 720 preferably is linked for communication so that inputs of a user may be managed to regulate access to the deposit box. According to some preferred embodiments, the touch screen 720 may interface with a computing component, such as, for example, the computer 730, which is located at the site of the facility 711 where the deposit box 710 is located. According to some alternate embodiments, the touch screen inputs entered on the screen 720 may be communicated and processed at a location outside of the facility 711. Still yet some other embodiments may be configured with both types of operation communications or linkages between the touch screen inputs, the computing component (the computer 730) at the retail banking facility 711, and one or more remote computing components, which may be located outside of the facility, at a remote location accessible through a network. Some examples of the remote computing components include a server or management computer 800 of the establishment that operates the facility, a hosting computer 801, or a data management computer 802.

According to preferred embodiments, the display screen 720 is a screen of a tablet 721, and the tablet 721 is configured with one or more communications components. According to a preferred implementation, the tablet 721 may utilize a connectivity protocol, such as Wi-Fi protocol to connect with a cellular modem device, such as a hot spot. Preferred embodiments provide the tablet 721 with the capability of communicating via Wi-Fi and cellular, so that, if desired, the deposit box operating mechanisms (such as the mechanism 120 of the deposit box 110) that are used to actuate the deposit box 710 may be managed using the tablet 721. According to some embodiments, the deposit box 710 may receive communications and instruction signals from the tablet 721. For example, according to some preferred embodiments, the Wi-Fi of the tablet 721 may be used to operate the deposit box mechanism, such as, for example, by operating a solenoid configured to open the access door or panel 713 to provide access to the access opening 712.

The tablet 710 preferably may be directly wired for power from the facility's power source (power company). The cellular modem device 735 preferably resides in a secure location (inside the facility 711), within the communication range of the tablet 721. The cellular modem device 735 preferably is hardwired and situated within the structure of the facility building 711 where the deposit box 710 is located. The cellular modem device 735 preferably provides a connection that comprises a communications link 736 between the tablet 721 and one or more remote computing components (e.g., 800, 801, 802). For example, the tablet 721 may be linked through the cellular communication arrangement to communicate with a host computing component 801 through which operations of the deposit box 710 and user verifications may take place. In some other embodiments, the tablet 710 may communicate with a remote computing component, such as a server 800 of the establishment or a server 802 operated on behalf of the establishment. One or more computers may be configured to secure and provide customer information to the computing components as needed to operate the system based on the user transactions to be carried out.

According to an exemplary embodiment, the user may enter information at the tablet 721 using the touch screen 720 of the tablet 721 (and/or other input mechanism, such as a virtual keyboard on the tablet display screen). The user may enter user specific information to identify the user, and alternatively, or in addition to other inputs, user identification may be obtained through user biometric data. According to some embodiments, the tablet may include a biometric reader, such as a digit scanner 726, so that a user may place a finger or thumb on the biometric reading element or sensor 726a of the scanner 726, and through processing of the input, the user may be verified. According to preferred implementations, the biometric input verification from the user biometric data obtained with and transmitted by the tablet 721, may take place by transmitting the data to and processing it at a remote computing location (e.g., with one or more of the remote computers 800, 801, and/or 802). User information, including biometric data and/or other user information that may be specific to the user, such as an identification name, password, or the like, may be stored and associated with one or more accounts of a user. The information may be stored in a database, such as a lookup database, or other type. Upon identification of a verified user match, the remote computing station, which, for example, according to some preferred embodiments may be a hosted server (e.g., such as the computer 801), while according to other embodiments may be a server operated by or on behalf of the establishment (e.g., computers 800 and/or 802), communicates a signal to the tablet 721 indicating verification of the user. These communications preferably may take place through the cellular modem (or hot spot) device 735. The user may then be logged on and may use the tablet interface (e.g., touch screen 720) to select a transaction. Where the user selects an option to make a deposit (such as a deposit at the drop box location, e.g., after the retail banking facility has closed for the day), the deposit box operating mechanism is actuated to open an access opening (e.g., such as the opening 712) to provide the user with access to the slot into which the deposit may be placed. In the exemplary embodiment shown in FIG. 16, the access opening 712 is regulated by an access panel 713 which blocks the opening 712, but may be moved out of its blocking position when a deposit is to be accepted.

According to some embodiments, the tablet 721 is configured to communicate with the deposit box regulating or operating mechanism 728 to provide a signal to trigger actuation of the access opening 712 in coordination with a verified user that has elected to make a deposit at the facility 711. According to some alternate embodiments, the tablet 721 may communicate with a retail computing component 719 at the retail banking facility that is configured to control the operations of the deposit box 710, including the operating mechanism 728. In yet other embodiments, the tablet 721 may provide a signal to a remote computing component (such as, for example, a hosting component 801, or remote establishment component 800, or other component 802), that is processed, and wherein the remotely situated computing component (e.g., host or other component) communicates a signal to the operating mechanism 728 of the deposit box 710 to actuate the access opening 712 to accept the user deposit transaction. In the exemplary embodiment depicted, the access opening 712 is regulated by the panel 713 which blocks the opening 712, and which provides access to the opening 712 (for making a deposit), when the panel 713 is moved out of a blocking position. As with the other embodiments shown and described herein, the access opening 712 may be accessed through means other than the panel 713, such as a foldable drawer, slide, roller panel, or other suitable element regulated by the regulating mechanism 728.

According to embodiments, the deposit box 710 may be configured to operate and provide access for the user through an electronic mechanism. According to some other embodiments, the user may enter transaction information, including details about the deposit, and then use a key provided to the user to access the deposit box 710 to make the deposit. In some embodiments, configurations may include both a physical lock 737 that the user may unlock with a key, and an electronic locking mechanism (e.g., 728, and see 120 of FIG. 1) that may be operated based on user inputs of a depositing user. The deposit box 710 may be configured to accept traditional deposits where the user merely uses a key and lock 737 to make a deposit, and where the user bypasses the touchscreen 720 of the tablet 721 or other input device. For example, in the case where the user arrives at the retail banking facility location 711 where the deposit box 710 is located, and does not have the key, the user may resort to the electronic verification and electronically actuate the operating mechanism, by providing the required user input to obtain access electronically to the deposit box opening 712. This may be done by the user entering a unique verification code, or a biometric at the tablet interface, and having access to the deposit box access opening 712 upon being verified.

Alternatively, the deposit box 710 may be configured so that a user desiring to use a key is required to make an input on the touch screen 720 (which may involve a different set of inputs than other depositing users, such as no verification, a mere indication that a transaction is being made, or of a bag number or some other data item).

According to some embodiments, the system may be configured for use with a user smartphone or smart device. For example, the user may be provided with, or upon verification, the user may receive, a communication that comprises a bar code, QR code, or other scannable image, and may present that image to the tablet image reader (e.g., camera 727) so that the image may be scanned. Upon a successful scan, the user may be verified and thus have access to the deposit box access opening 712 as a result of the electronic deposit box operating mechanism 728 being actuated (from a successful identification of the user device scan).

The system may generate a receipt for the user. A user that has conducted a deposit box transaction may be provided with a receipt. Preferably, the receipt comprises an electronic receipt. According to some embodiments, the user receives the receipt once the transaction has been completed. For example, a user that has completed a transaction by making a deposit may receive an electronic receipt via an electronic communication, which may take place directly to the user's computing device (e.g., smartphone) from a component at the facility or via a facility component, or may be generated and/or delivered apart from the facility components (via a connection between the user phone and the internet or other network). Alternative embodiments may even generate and provide a transaction code, image, QR code, that the user may use to confirm, obtain or manage transactions details (which may be done subsequent to the deposit transaction).

In the embodiments illustrated, the tablet 721 may be configured to receive updates as needed, which may be provided to the tablet 721 through a signal from the tablet connection, such as the cellular communication component 735. For example, according to some embodiments, a remote computing component, such as, for example, the host 801, may provide updates and the like and configure the tablet 721 with updates, improvements, enhancements or other modifications. For example, some preferred embodiments of the system are configured to provide monitoring and management by a host. The tablet 721 as well as other components of the system with which the tablet 721 is configured to operate, may interface with the host 801 to provide a status of the system operations at the retail banking facility. This may be done through communications between the tablet 721 and the host 801, as well as the tablet 721 and other components or computers (e.g., 719, 800, 802).

According to some embodiments, the system is implemented so that the tablet 721 may relay information about the status of the system and components to the host 801. For example, according to some implementations, the host 801 is able to know whether the system is operative at the retail banking facility 711, or whether there is a service interruption, such as for example, a bad component, down communication, or component malfunction. The host 801 may address the problem, if software or other remotely manageable function, or may dispatch appropriate personnel and/or equipment to remediate the problem. The system may be configured to provide a message, or the host 801 may provide a message, directing a customer to an alternate location (if the establishment has approved of that feature or operation). The host 801 therefore may communicate with a plurality of deposit box systems at each of the retail locations (711 and others). The host 801 may host a number of the retail banking deposit box systems, and may collect and provide data to the establishment (which may be done at a predetermined interval, or in another manner, including as described herein in connection with other embodiments). The host 801 may provide the data to the establishment computer 800 or a computer 802 operated for the establishment.

The system preferably may be configured to use existing deposit bags or alternative bags. According to some implementations, the user is a customer of the retail banking establishment. The retail banking establishment may provide the user with bags containing indicia thereon to specifically identify deposits made with those bags as connected with the particular user, and, in some instances, even a particular account of the user. The bags preferably may contain indicia thereon, which, for example, may be a serial string (number, letters or other code), a bar code or QR code. According to some embodiments, the bag may be provided with scannable indicia thereon, which the user may scan with the user smart device, as part of the pre-posted transaction data. Alternatively, the code may be entered directly as an input by the user, and the bags may include scannable indicia, as well as a string that the user may read and enter. According to embodiments, the user may be provided with serialized bags, where the user has a set of bags with numbers increasing within a series (100555, 100551, 100552, . . . ). Preferably, the retail facility that receives the bags through the deposit box (such as, for example, those boxes 110 or 710), which bags contain the user deposit of cash checks, cards, etc. therein, empties the bag contents and logs it in (with some cases requiring at least two employees of the establishment to handle this task). The bags are then returned (or made available) to the user so the user receives back the same serialled bags for reuse. Alternatively, the user may be provided with a supply of tamper evident plastic bags, which are marked with indicia thereon. The user seals the deposit within the bag, and then proceeds to make the deposit at the retail banking facility deposit box, in accordance with the method and system described herein.

According to some alternate embodiments, the user, upon prestaging a transaction, may be provided with a code, which may be a string that the user inputs at the deposit box touchscreen 720, or may be a bar code, QR code or other scannable indicia, that the user may scan at the deposit box tablet 721, which when input or read by the tablet (image sensor or camera 727), may complete the transaction by obtaining any other information required and/or by opening the deposit box access slot 712 to provide the user with access to the box 710 so the user may make the deposit. The prestaging also may be done through a computer, smart phone or device application, and may use images from the camera of the smart device (such as a scannable code, tones, or graphic), to facilitate obtaining information about the user transaction to be made. According to some embodiments, a splash screen may generate instructions for preparing a transaction (e.g., such as prestaging the transaction to be made, e.g., such as prestaging of a deposit to be made at a later time). The splash screen may be displayed on the device used by the user for prestaging.

The user applications may be configured to operate in conjunction with a mobile wallet. This may be the mobile wallet that the establishment provides, and the system may be provided and incorporated into the mobile wallet of the establishment. The host may continue to host the deposit box operations, and the mobile wallet of the establishment may be configured to seamlessly integrate with the after hours deposit system (whether hosted remotely by a host 801 or as part of the establishment system, 800). According to a preferred implementation, the host 801 may provide information to the mobile wallet application directly, may host the mobile wallet, or may provide the transaction to one or more computers of the establishment that operate the mobile wallet, or provide data used to support the mobile wallet.

According to some embodiments, the system may be configured to function in conjunction with a user application. For example, a user may download or otherwise be provided with access to an application or program that allows the user to make a pre-deposit transaction input, including, such as, for example, those described herein and shown in the exemplary screen displays of FIGS. 4-10. Upon preparing a transaction, and entering the transaction information into the input screen (the user interface), a transaction receipt (for the pending transaction) may be generated and provided to the user for display on a smart device of the user (such as a user smartphone). The user may be provided with an advance receipt, as well as an indicator of any transaction steps that remain to be completed (e.g., making the physical deposit). According to some embodiments, the system may be configured so that the receipt may be generated from a scan of the user's phone or smart device at the facility location. This may be done by the image sensor (such as a camera), and associated scanning software provided on the tablet. The user may be provided with a receipt which may be geotagged with the deposit location. According to some embodiments, the receipt and geotagging may be carried out by a scan of the user phone or smart device at the time of making the drop, and just prior to the user making the drop in the deposit box. According to some embodiments, the system may be hosted and the tablet may generate screens with a menu, instruction or status, for the user to maneuver through steps involved in making the deposit. Alternatively, the system may be configured to operate in conjunction with an application programming interface that allows the facility to provide screen changes, and provide advertising on the display, so that the establishment or even the local facility or branch, if desired, may be able to make changes, even though a host may mange hosting of the transaction details and the operation of the deposit box mechanism, as well as the reporting of the deposits (from the host to the establishment). The establishment may determine how it desires to receive the host deposit information and data, which may be the receipt of a file formatted with the transactions, and transaction information (e.g., user ID, time and location of deposit, transaction amount, type, account number, whether pre-transaction information was used, whether a smart device application was used, and other details desired). According to some embodiments, the system may be configured to detect when a traditional user with a key has made an access (e.g., for a deposit) to the deposit box, where that user uses only a key, with no electronic transaction information entered. Alternatively, the establishment may configure the drop box to require or encourage entry of some type of information on the tablet or via a smart device prior to making the deposit (but would not have to). In the embodiment where a user makes a deposit using a key (and no electronic inputs or exchanges), the system may detect and record the deposit box operation (such as the access panel being opened, or a sensing of a physical deposit being made into the box). The camera of the tablet also may be configured to record any time a transaction is commenced (or alternatively, may record upon detecting activity within the field of view or frame).

Figure 17:
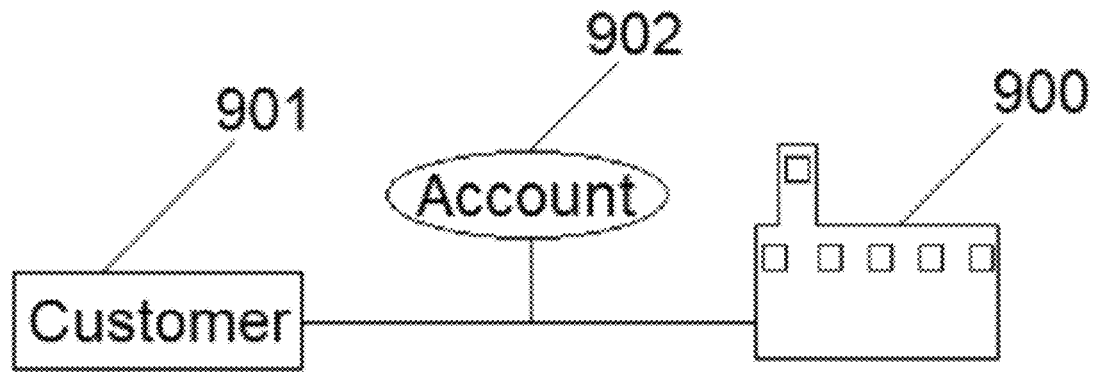
FIG. 17 is a schematic illustration of an exemplary implementation of a method and system for handling transactions.
Figure 18:
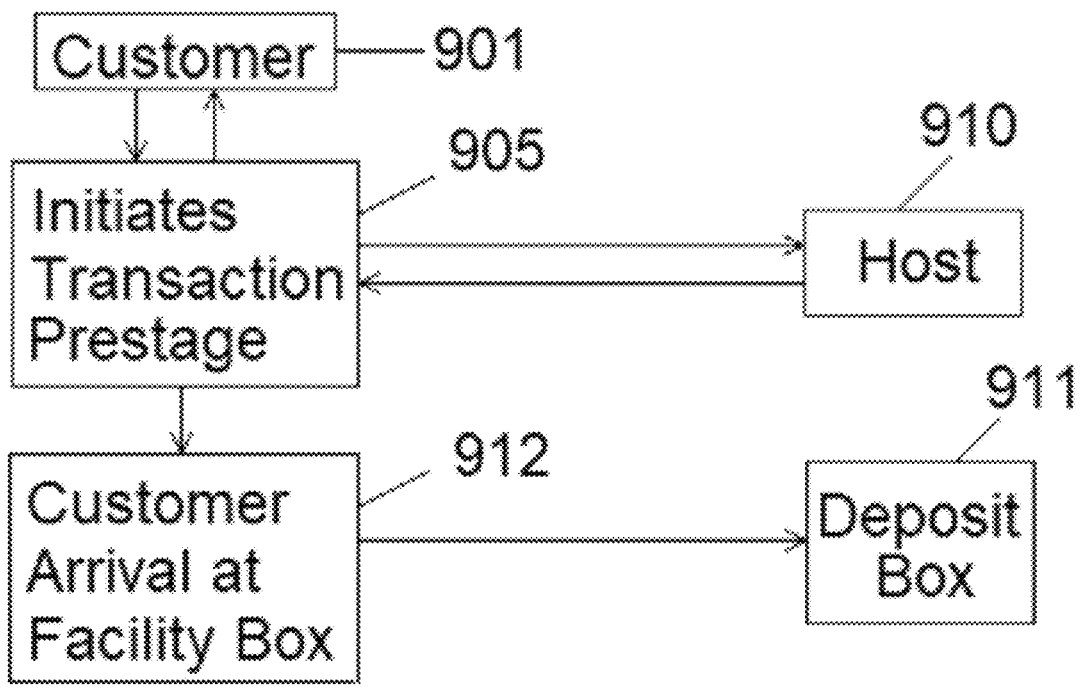
FIG. 18 is a schematic illustration of an exemplary implementation of a method and system for handling transactions shown in an arrangement where the after hours transactions are managed with the use of a host.
Figure 19:
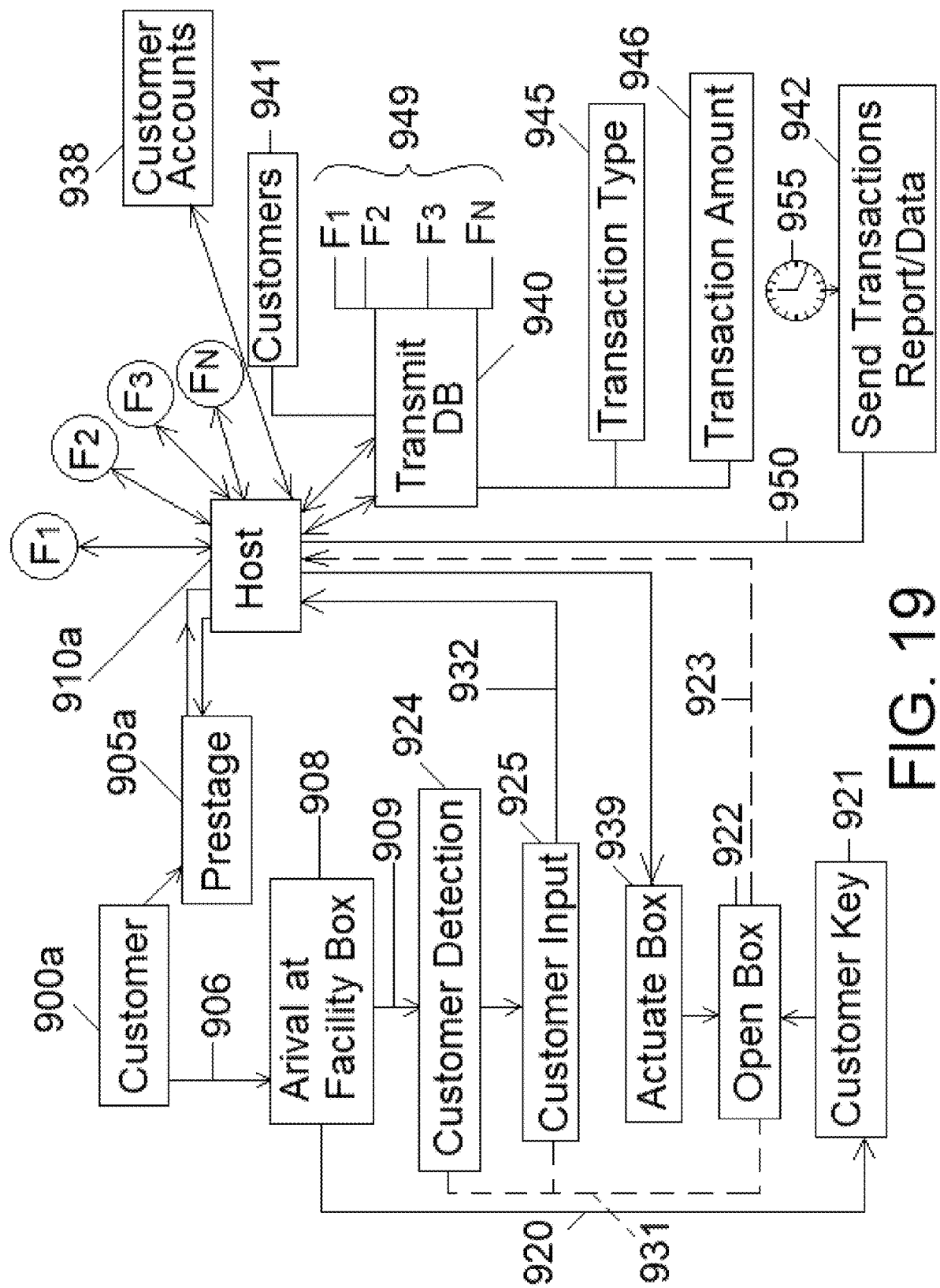
FIG. 19 is another schematic illustration of depicting an exemplary implementation of a method and system for handling transactions.

Referring to FIGS. 17-19, exemplary embodiments are illustrated to depict implementations of the method and system. Referring to FIG. 17, there is illustrated a facility 900 at which a customer 901 may conduct retail banking transactions. The customer 900 has an account 902, which may include customer information for transactions that the customer 901 handles in connection with the facility 900 (and the enterprise that owns or operates the facility). The account 902 is shown linked to the customer 901 and establishment or facility 900, which may be through any suitable network as well as a database or server that maintains customer account information. The schematic depiction in FIG. 17 shows the customer 901, account 902 and enterprise facility 900 linked together. As shown and described herein, information for a customer account 902 may be stored and made available from a server which may be operated by an enterprise or by another entity for or on behalf of the enterprise.

Referring to FIG. 18, an arrangement is depicted where the after hours retail banking transaction is managed by a host 910. In this exemplary depiction, the customer 901 initiates a prestaged transaction 905, which is done through or facilitated by the host 910. The customer 900 carries out a prestage transaction, block 905, and prepares transaction information, which in this example, is information about a deposit of money and checks to be made at a facility (e.g., where a deposit box is located). The customer may provide inputs of the transaction (e.g., customer identification/verification, account, transaction types, amounts), which are collected and processed by the host 910. The customer 901 then arrives at the facility 912, and accesses the deposit box 911. The host 910 preferably may communicate and exchange information with a server or other computer where the customer records or identifying information is maintained (e.g., the enterprise computer, or computer that handles customer data for the enterprise).

Referring to FIG. 19, the further implementation of a system is depicted according to an exemplary arrangement. The customer 900a has the option to initiate a transactional prestaging, represented by the block, prestage 905a, where a portion of the transaction may be commenced. In this example, the prestage 905a is carried out with a host 910a, which manages some or all of the prestaging activity. Embodiments where the customer is provided with a key to access the deposit box also is represented as an option in this example. The customer 900a in this example also has the option, path 920, to use the customer key 921 to open the deposit box, block 922. The use of the key 921 to open the box, block 922, in some embodiments, may generate a communication to a remote computing component, such as the host 910a in this example, through path 923. The host 910a processes the signal to record a detection of the opening or access to the deposit box. In the case where the customer 900a arrives without the customer password or customer device, or is otherwise unable to be detected (e.g., block 924) or provide input (block 925), then the signal communication 923 of the opening of the box 922 with the key 921, may not generate specific customer identifying information. However, the operation (opening) of the deposit box and/or entry of an item (deposit) therein, may be detected by one or more sensors disposed at or within the deposit box, which communicate a signal to a remotely situated computer, such as the host 910a in this example. According to alternate operations, where a customer device is present with the customer 900a at the facility box when the customer arrives, block 908, the detection of the customer, block 924, may be accomplished where the deposit box includes or where a proximal sensor is provided to detect customer devices at the sensing area of the box location. The path 931 represents a communication of information which may be transmitted to the host 910a (e.g., via path 923) in connection with a signal that indicates an opening of the deposit box, block 922. The host 910a may be configured to process this information by relating the detected customer device (and associated customer or account) with the transaction or deposit. For example, the opening of the box may be timed, and the presence of the customer device detection, block 924, may be timed, so that at a time (or even within a window), the deposit may be associated with a customer, or flagged as a potential association. Associations may be handled automatically, or require further confirmation or management.

According to another example, an optional processing step may be a customer input, 925. The customer input 925 may be carried out at the deposit box facility 908. According to embodiments, the customer 900a makes an input, which in the examples, may include a biometric identifier, scannable code, or other input on the touch pad screen, or combinations of these. The input is communicated to a computing device for processing. In the example of FIG. 19, the customer input, block 925, is communicated via a pathway 932 and is processed by the host 910a, and, upon verification based on the input (or the customer device detection or combinations of the input and detected information), the host actuates the box 939 and the deposit box is opened, block 922. As illustrated in the exemplary process diagram, the host 910a communicates a signal to the deposit box operating or regulating mechanism via path 923, to open the deposit box. The customer 900a may then make the deposit in the deposit box.

According to another embodiment, where the customer input is entered incorrectly, or for some other reason is not able to trigger the actuation of the box, the customer may use a key to access the box opening and make a deposit. The system may store the customer inputs, and at a subsequent time, or at the present time, communicate those inputs as a failed or attempted transaction. The system may be configured to match timing of the attempted or failed input with the opening of a deposit box, and may use that information to match or facilitate matching of a deposit with a customer (and with the timing of the deposit).

The example illustrated in FIG. 19 includes a host 910a. The host 910a is configured to exchange information with a customer database, Customer Accounts, block 938. Customer Accounts, 938, may comprise a database that is stored on a computer that provides customer information sufficient for the host 910a to access to provide the customer verification for a transaction. In the example depicted, the data from the Customer Accounts, 938 exchanges information with the host 910*a*. The Customer Accounts 938 may be stored on or accessed through one or more computers that are maintained by or for the establishment, and may be remotely situated from the host 910*a*. According to some embodiments, the host 910*a* may generate a listing of customers 941, which may be compiled from the transactions recorded and/or managed, or may be compiled or collected from the database of Customer Accounts, 938. According to some embodiments, customer information 941 may be stored with information that includes the respective customer identification information for verification of the customer and customer transactions. According to some alternate embodiments, the customer information is obtained from accessing the data from the Customer Accounts 938, when needed to verify a transaction.

According to a preferred embodiment, where the host 910*a* manages the facility deposit box transactions, the host 910*a* may generate and communicate transaction reports 942 of transactions. The reports, for example, may include the transaction type, transaction amount, customer/account, and the status of the prestaged transaction (e.g., deposit not yet made, deposit made, or other status). According to a preferred embodiment, the host 910*a* may collect and obtain transaction information that may include one or more of the prestaging 905*a*, customer activities (e.g., 908, 924, 925, 921), box activities (921, 922, 939), and deposit box transactions, and may process this information. The information may be stored, including for example, in a database, represented in FIG. 19 as Transmit DB, 940. Transmit DB 940 includes customer information, and includes a transaction type 945, a transaction amount 946, and may include other information regarding operations. The Transmit DB 940 also may be stored in a format, or otherwise configured to break down any of the transactions or information by facility, reference 949. For example, Transmit DB, 940, may include information for the facilities (e.g., F1, F2, F3, . . . to $F_N$) and may exchange information, including transactions that have been made, with the facility through the host 910*a*, or through another computer of the enterprise (such as from the host to the other computer). The host 910*a*, communicates, for example, via path 950 in FIG. 19, transaction information to the establishment. In this example, the host 910*a* is remotely situated, and provides the information to the establishment so that the establishment may use the information to confirm the transactions. The host 910*a* may provide the information for a transaction period at specific times or time intervals, represented by the timer or clock 955. The establishment may receive the information (from the host 910*a* in this example), and process that information to associate respective customer deposits with the respective customer accounts. Confirmations may be executed upon confirming the physical deposit. The establishment may carry this out in a number of ways, including through a report provided to each facility that contains the deposit information for the transactions (e.g., at the deposit box that were carried out after the normal operating hours).

In the exemplary depiction, the host 910*a* may manage a plurality of facility locations, which are represented by F1, F2, F3, . . . to $F_N$. The facility locations each may have one or more deposit boxes, and transactions may be carried out at those locations. The host may then communicate the facility transactions to the establishment computer or other computer that the establishment has designated.

Although embodiments have been described herein in conjunction with the implementation of low energy communication sensors (such as Bluetooth® sensors), the systems may be configured with the tablet type device for detection through a user input, a user device or communication (including Bluetooth®), where the tablet is also configured to communicate using a Wi-Fi to cellular connection (e.g., to communicate through the cellular modem or hot spot provided within the retail banking facility). The sensor may be provided as a separate sensor, such as those shown and described herein in connection with the embodiments depicted in the figures and flow diagrams, or alternatively, the tablet may be provided with a camera, which may be configured as a sensor to detect when a user is within a transacting area. The tablet camera may be configured with a program that defines the transacting area, and samples the image to determine when the detection area has a significant change, indicative of an individual.

The retail banking facility, as part of the retail banking consumer or customer application, or separately, as part of a separate application, may provide an application that the customer may utilize or install on the customer smart device. The application preferably is configured to recognize the retail banking facility computing component when the customer device (or other device registered by the customer) using the software application is within the sensor or communication range of the retail banking facility computing or signal generating components.

According to some embodiments, the system may be configured to manage and measure metrics of customers using the facility, including those making pre-designated transactions. For example, the types of transactions, times at which the transactions are made, time interval between transaction initiation and completion or arrival at the facility, as well as geographic location tracking, may be available for data collection and usage. The system may be designed to provide queries on the device screen of the user that may require the user to respond prior to or during completion of a transaction. A user that has initiated a transaction may receive reminder communications that an initiated transaction requires completion.

According to some embodiments, the system may be configured to provide remote hosting services. For example, the retail management component and/or retail computing component at the retail banking facility may provide specific transactional data that may be uploaded or otherwise shared with a remote hosting facility. The remote hosting facility may be a service provider of the notification system, or may be a separate entity altogether. According to some embodiments, the information from the retail computing component may be configured to obtain data and metrics without customer account information, or any protectable information, so that the metric data, regarding for example, types of transactions, completions of transactions, time of transactions, and the like may be communicated or made available to a remote hosting facility (which may be the retail banking establishment, or more preferably an entity other than the retail banking establishment). As used and described herein, the banking facility and bank branches may also refer to a credit union and branch locations of the credit union (e.g., the establishment may be a bank, or may be a credit union).

The computing component also may be referred to as a kiosk or a management computing component, and may be programmed with software that contains instructions to instruct a processing component, such as a processor, microprocessor, or microcontroller, of the computing component, to process the information, including sensor information, transaction data, time stamping, employee data, as well as control the collection of information from activities of customers, employees, and transactions that take place. The computing component (kiosk or management computing component) preferably is configured with software that provides the capability for a user, such as, an administrator or manager level personnel, to make changes to implement settings, permissions, and surveys. In addition, the communications and exchanges of information between the computing component and the customer devices may be encrypted to provide additional security. Alternatively, and in addition, according to some preferred embodiments, the system may be configured to manage transactions the facility, including receiving deposits at a deposit box, where customer account information is not required to be shared or communicated by the system while managing the transaction service using the system. The system also may be implemented in conjunction with vehicle drop offs and pick-ups for an establishment that may receive vehicles at a facility, or may lease or lend them to customers or employees.

The above described methods may be performed, and the above described systems may be implemented, one or more computing components, which may comprise a computer including a processor for executing appropriate instructions stored in a memory. Devices for handling and managing transactions at a facility, such as fund deposits, have been described as including or operating in conjunction with one or more computing components or circuitry which may include a processor controlled by instructions stored in a memory. The memory may be random access memory (RAM), read-only memory (ROM), flash memory or any other memory, or combination thereof, suitable for storing control software or other instructions and data. Some of the functions performed by the transformation methods and apparatus have been described with reference to flowcharts and/or block diagrams. Those skilled in the art should readily appreciate that functions, operations, decisions, etc. of all or a portion of each block, or a combination of blocks, of the flowcharts or block diagrams may be implemented as computer program instructions, software, hardware, firmware or combinations thereof. Those skilled in the art should also readily appreciate that instructions or programs defining the functions of the present invention may be delivered to a processor in many forms, including, but not limited to, information permanently stored on tangible non-transitory non-writable storage media (e.g. read-only memory devices within a computer, such as ROM, or devices readable by a computer I/O attachment, such as CD-ROM or DVD disks), information alterably stored on tangible non-transitory writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components. The sensors may include a service discovery protocol (sdp) which provides the capability to discovery devices that are nearby within a sensing or detection range.

While the invention is described through the above-described exemplary embodiments, it will be understood by those of ordinary skill in the art that modifications to, and variations of, the illustrated embodiments may be made without departing from the inventive concepts disclosed herein. For example, although some aspects of the transacting system and method have been described with reference to a flowchart, those skilled in the art should readily appreciate that functions, operations, decisions, etc. of all or a portion of each block, or a combination of blocks, of the flowchart may be combined, separated into separate operations or performed in other orders. In addition, although a deposit box mechanism is illustrated in an exemplary embodiment, other deposit boxes may be used in conjunction with the system, method and devices. A solenoid has been described as an exemplary mechanism for controlling the deposit box structures, however, other mechanisms may be employed, and although reference is made to a solenoid, a plurality of solenoids may be provided. The deposit box and regulating mechanisms have been schematically represented to illustrate the invention. Moreover, while the embodiments are described in connection with various illustrative transactions data, one skilled in the art will recognize that the system may be embodied using a variety of transaction data. Furthermore, disclosed aspects, or portions of these aspects, may be combined in ways not listed above. Accordingly, the invention should not be viewed as being limited to the disclosed embodiments. The description is illustrative and is not to be construed as limiting the scope of the invention. Various modifications and changes may occur to those skilled in the art without departing from the spirit and scope of the invention described herein, and as defined by the appended claims.

What is claimed is:

1. A depository comprising:
a) a containment having a frame, an interior space and at least one access opening that communicates with the interior space providing access to the interior space through the at least one access opening from the exterior of the containment, the access opening providing a passageway from the exterior of the containment to the interior space;
b) at least one movable closure panel situated to block access to the access opening and regulate access to the interior space of the containment through the access opening;
c) a regulating mechanism including an actuator and control circuitry, wherein the actuator is movable from a first position to one or more other positions, wherein the first position regulates the at least one movable panel to be in a blocking position where the at least one movable panel blocks access to the access opening and interior space, and wherein the at least one or more other positions include at least one position where the at least one movable panel is released from the blocking position so that access is provided to the access opening;
d) wherein the regulating mechanism control circuitry includes an interface and a transmitter, and wherein the transmitter transmits a signal when the interface detects an input;
e) wherein the actuator moves the at least one movable panel between the first position where the at least one movable panel blocks access to the containment space, and to the one or more other positions where the at least one movable panel is released from the blocking position so that access is provided to the access opening;
f) wherein when the signal contains a credential from a prestaged transaction that includes at least one credential associated with the prestaged transaction, the actuator moves from the first position where the at least one movable panel blocks access to the access opening, to the at least one other position where the at least one movable panel is released from the blocking position so that access is provided to the access opening; and g) wherein the actuator returns to the first position, and wherein said actuator when returned to the first position regulates the at least one movable panel to be in the blocking position where the at least one movable panel blocks access to the access opening and interior space.

2. The depository of claim 1, wherein said containment includes at least two openings, a first one of said at least two openings comprising the access opening whose access is regulated with the regulating mechanism actuator and the at least one movable panel, said access opening being configured to receive deposits therein, and a second one of said at least two openings comprising a retrieval opening for retrieval of deposits from the containment that were placed into the containment via the first opening.

3. The depository of claim 2, wherein said containment includes a second panel that is disposed to cover the retrieval opening, wherein said second panel includes a lock.

4. The depository of claim 2, wherein the actuator, when in the first position, locks the door panel in a locked position.

5. The depository of claim 4, wherein the actuator, when in the at least one position where the door panel is released from the blocking position so that access is provided to the access opening, unlocks the door panel, wherein the interface comprises a scanner.

6. The depository of claim 5, wherein the actuator control circuitry is configured to receive or exchange communications with a user device.

7. The depository of claim 6, wherein the actuator control circuitry is configured to communicate with a remote host computing component to receive a signal containing the at least one credential from the remote host computing component.

8. The depository of claim 7, wherein the at least one credential received from the remote host computing component by said control circuitry corresponds with the prestaged transaction.

9. The depository of claim 8, wherein a received or exchanged communication between the actuator control circuitry and the user device comprises the at least one credential received by the user device from the remote host computing component that corresponds with the prestaged transaction.

10. The depository of claim 9,
wherein the data received from the remote host computing component by the control circuitry that corresponds with the prestaged transaction comprises transaction data, and
wherein the data received by the user device from said remote host computing component that corresponds with the prestaged transaction comprises transaction data, and
wherein the actuator opens the access opening when the prestaged transaction data received from the received communication with the user device corresponds with the prestaged transaction data received by said control circuitry from the remote host.

11. The depository of claim 10, wherein the remote host computing component transaction data includes the at least one transaction credential, and wherein the data that the control circuitry receives from the remote host computing component includes the at least one transaction credential, and wherein the wherein the actuator opens the access opening when the transaction credential received from the received communication with the user device corresponds with the prestaged transaction data received by said control circuitry from the remote host.

12. The depository of claim 11, wherein, when the prestaged transaction data received from the received communication with the user device does not correspond with the prestaged transaction data received by said control circuitry from the remote host computing component, the actuator does not open the access opening.

13. The depository of claim 12, wherein the control circuitry includes sensing circuitry, wherein the sensing circuitry is associated with the scanner, and wherein the sensing circuitry processes inputs from the scanner.

14. The depository of claim 13, wherein the transaction credential is readable by the scanner.

15. The depository of claim 14, wherein the actuator responds to release the panel from the blocking condition when the regulating mechanism sensing circuitry matches the credential from the prestaged transaction with the credential presented by a user that comprises one or more of a QR code, or geolocator.

16. The depository of claim 15, wherein the actuator comprises a solenoid that is electronically actuated by the regulating mechanism control circuitry.

17. The depository of claim 12, wherein the interface comprises a sensor, and wherein the sensor is configured to detect an input from the user device; wherein the sensor detected input from the user device is implemented using a discovery mechanism; and wherein the discovery mechanism comprises a service discovery protocol provided in the circuitry.

18. The depository of claim 11, wherein the regulating mechanism control circuitry is programmed with instructions for identifying the credential provided or made available to the user device when the credential is provided to the interface.

19. The depository of claim 18, further comprising an enterprise computing system that maintains accounts for customers of the enterprise, and wherein the host computing component communicates to the enterprise computing system, transaction information of transactions taking place at the containment, and wherein for each input transmitted where the signal contains a credential corresponding with a prestaged transaction, the host computing component communicates to the enterprise computing system transactions taking place that resulted in the release of the actuator from its blocking position.

20. The depository of claim 19, wherein said host computing component communicates to said enterprise computing system transaction information for a time interval that includes information for a plurality of transactions taking place that resulted in the release of the actuator from its blocking position that comprise deposits made at the containment that have taken place during the time interval, including each deposit that corresponds with the prestaged transaction, wherein a signal was generated that resulted in the release of the actuator from its blocking position.

21. The depository of claim 2, wherein the depository is configured for mounting in a structure having a first side and a second side, and wherein when the depository is mounted in the structure, the access opening and the door panel are configured to be located on one of the first side of the structure or second side of the structure, and wherein said retrieval opening is configured to be located on the other of the first side of the structure or second side of the structure.

22. The depository of claim 1, wherein said interface comprises a digital device that includes one or more of (i) a scanner configured to receive an input via a scan of an image and electronically provide the input to the regulating mechanism, and (ii) a computing component that communicates with the user device.

23. The depository of claim 22, wherein the user device comprises a mobile digital device.

24. In a structure having a depository that includes a containment with an interior space therein, a first access opening providing access to the containment and being regulated by a movable access panel, and a second opening comprising a retrieval opening, wherein the structure has at least one first side that is accessible to users of the depository, and wherein said structure has an interior which is lockable to prevent access to the interior of the structure, the depository access opening and the door panel being located on the least one first side that is accessible to users of the depository, and wherein the retrieval opening is configured to be located in the interior of the structure for access from the interior of the structure; the depository comprising: (i) a frame, the at least one access opening communicating with the interior space and providing access to the interior space through the at least one access opening from the first side of the structure and from the exterior of the containment, the access opening providing a passageway from the first side of the structure and the exterior of the containment to the interior space; (ii) at least one movable closure panel situated to block access to the access opening and regulate access to the interior space of the containment through the access opening; (iii) a regulating mechanism including an actuator and control circuitry, wherein the actuator is movable from a first position to one or more other positions, wherein the first position regulates the at least one movable panel to be in a blocking position where the at least one movable panel blocks access to the access opening and interior space, and wherein the at least one or more other positions include at least one position where the at least one movable panel is released from the blocking position so that access is provided to the access opening; (iv) wherein the regulating mechanism control circuitry includes an interface and a transmitter, and wherein the transmitter transmits a signal when the interface detects an input; (v) wherein the actuator moves the at least one movable panel between the first position where the at least one movable panel blocks access to the containment space, and to the one or more other positions where the at least one movable panel is released from the blocking position so that access is provided to the access opening; (vi) wherein when the input matches data from a prestaged transaction that includes at least one credential associated with the prestaged transaction, the actuator moves from the first position where the at least one movable panel blocks access to the access opening, to the at least one other position where the at least one movable panel is released from the blocking position so that access is provided to the access opening; and (vii) wherein the actuator returns to the first position, and wherein said actuator when returned to the first position regulates the at least one movable panel to be in the blocking position where the at least one movable panel blocks access to the access opening and interior space.

* * * * *